US012487349B2

(12) United States Patent
Anderson et al.

(10) Patent No.: US 12,487,349 B2
(45) Date of Patent: Dec. 2, 2025

(54) GENERALIZED ANGLE-BASED TRACKER (GABT)

(71) Applicant: BAE SYSTEMS Information and Electronic Systems Integration Inc., Nashua, NH (US)

(72) Inventors: Matthew Anderson, Mont Vernon, NH (US); Bradley J. Bell, Manchester, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 567 days.

(21) Appl. No.: 17/965,400

(22) Filed: Oct. 13, 2022

(65) Prior Publication Data

US 2024/0142602 A1   May 2, 2024

(51) Int. Cl.
*G01S 13/68* (2006.01)
*G01S 13/526* (2006.01)

(52) U.S. Cl.
CPC ............ *G01S 13/68* (2013.01); *G01S 13/526* (2013.01)

(58) Field of Classification Search
CPC ............................... G01S 13/86; G01S 13/526
See application file for complete search history.

(56) References Cited

U.S. PATENT DOCUMENTS

| | | | | |
|---|---|---|---|---|
| 3,866,229 A | * | 2/1975 | Hammack | G01S 5/02 556/1 |
| 5,729,234 A | * | 3/1998 | Stetson, Jr. | F41G 7/2286 342/63 |
| 5,982,480 A | * | 11/1999 | Itzkovich | G01S 17/74 356/141.5 |
| 6,691,074 B1 | * | 2/2004 | Moriya | G06T 7/277 702/190 |
| 8,963,766 B2 | * | 2/2015 | Furukawa | G01S 5/00 342/175 |
| 2023/0383319 A1 | * | 11/2023 | Gonzalez | C12P 7/42 |

OTHER PUBLICATIONS

X. Rong Li and V. P. Jilkov, "Survey of maneuvering target tracking. Part I. Dynamic models," in IEEE Transactions on Aerospace and Electronic Systems, vol. 39, No. 4, pp. 1333-1364, Oct. 2003, doi: 10.1109/TAES.2003.1261132.

* cited by examiner

*Primary Examiner* — Marcus E Windrich
(74) *Attorney, Agent, or Firm* — Maine Cernota & Curran; Gary McFaline

(57) ABSTRACT

A method, system, and computer readable medium for performing a generalized angle-based tracker for a target determines angle-based information from a target signal, and initializes a Stationary Surface Filter (SSF), a Moving Surface Filter (MSF), and a Pseudorange Kalman Filter (PKF) with the angle-based information. Next, the SSF and MSF are scored by the PKF. If the information is associated, then the SSF, MSF, and PKF are updated. It is determined if at least one plausible Constituent Kalman Filter (CKF) exists for the SSF and MSF. If at least one CKF exists for the SSF and no CKF exists for the MSF, then the target is stationary surface; if at least one CKF exists for the MSF and no CKF exists for the SSF, then the target is moving surface; if no CKF exists for both the SSF and the MSF, then the target is moving airborne.

20 Claims, 20 Drawing Sheets

ENVIRONMENT

ENVIRONMENT

SYSTEM COMPONENTS

METHOD

SSF METHOD DETAIL

MSF METHOD DETAIL

PKF METHOD DETAIL

OWNSHIP POSITION /TRAJECTORY EXAMPLE

OWNSHIP POSITION AND CKF POSITION EXAMPLE

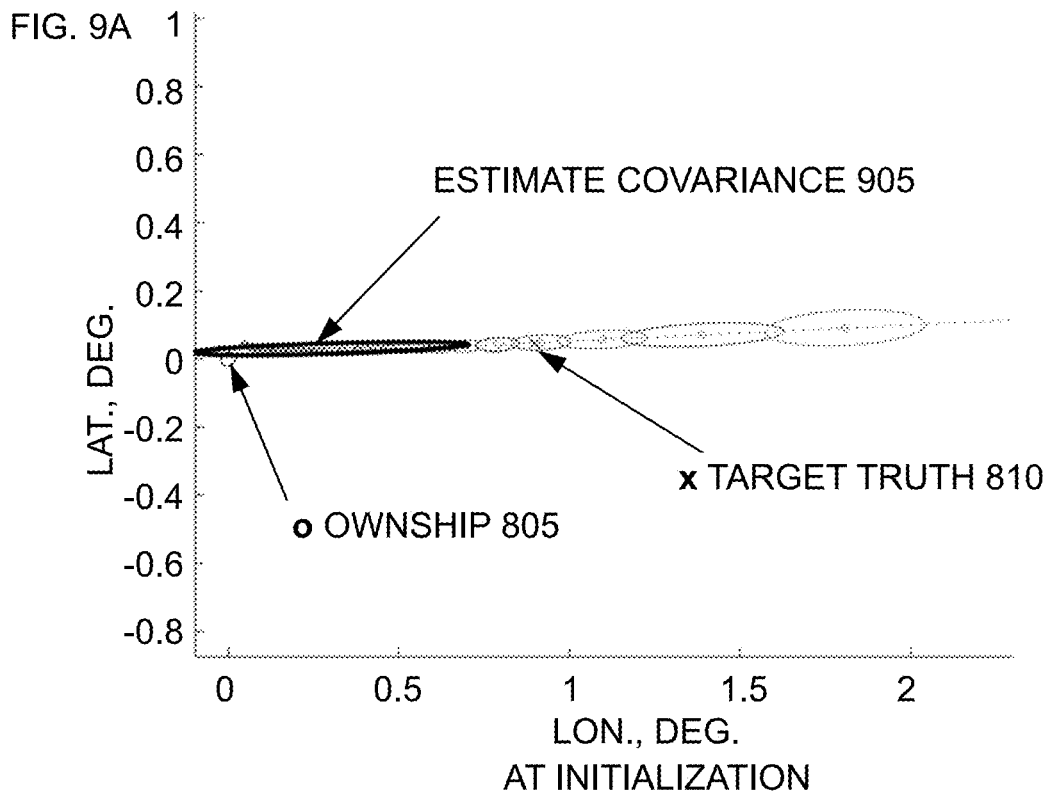
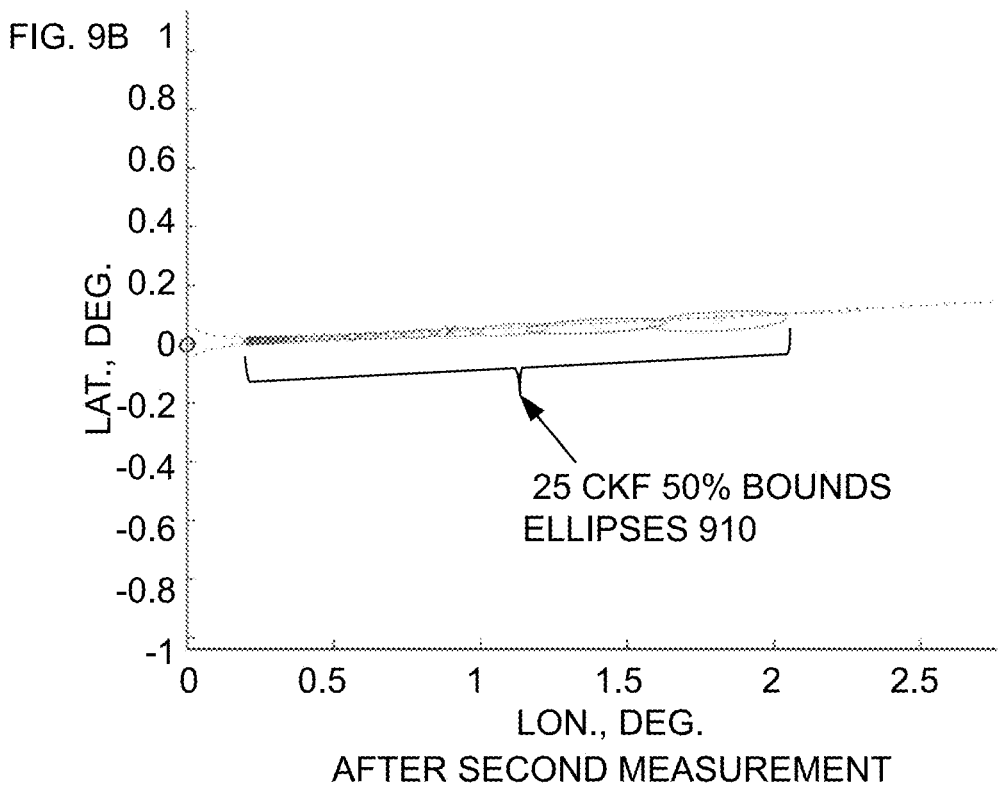
WEIGHTED SSF ESTIMATE EXAMPLE

NUMBER OF CKFS VERSUS TIME

ESTIMATION ERROR VERSUS TIME

SSF CHARACTERISTICS OVER TIME EXAMPLE

CKF VERSUS TIME PROFILE VARIABILITY BY CONDITIONS

TRUE & ESTIMATED 50% COVARIANCE MATRIX BOUNDS EXAMPLE

50% BOUNDS FOR SSF COVARIANCE & A PRIORI CRLB EXAMPLE

SSF DECREASING CKFs EXAMPLE

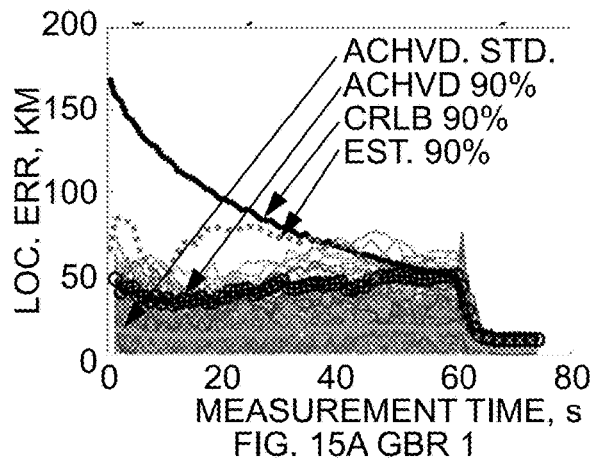
FIG. 15A GBR 1
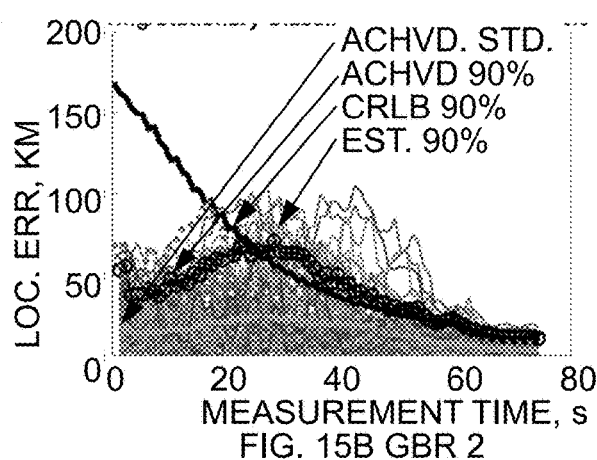
FIG. 15B GBR 2
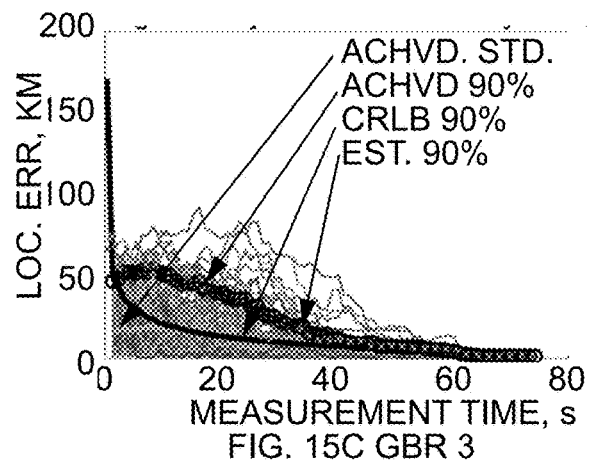
FIG. 15C GBR 3
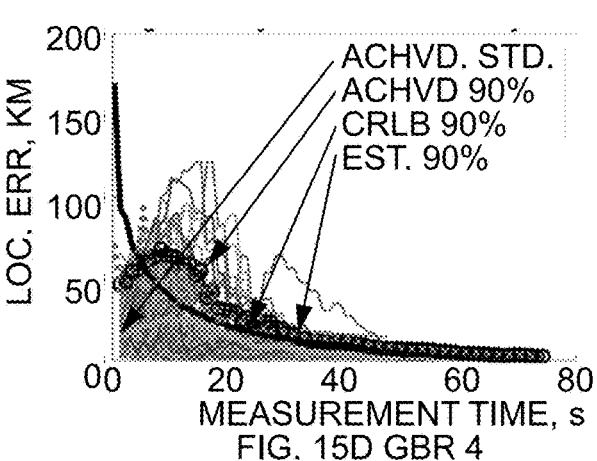
FIG. 15D GBR 4
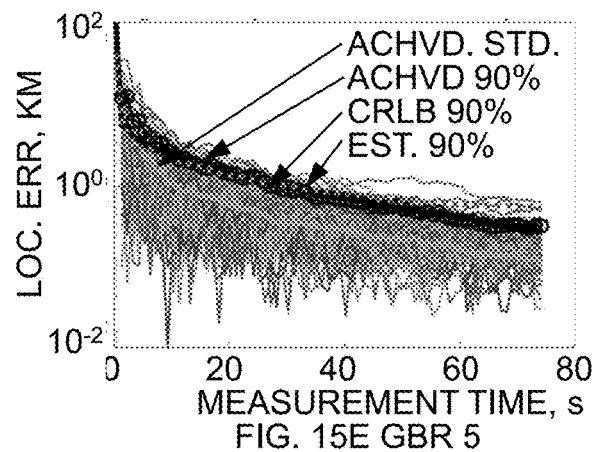
FIG. 15E GBR 5
MONTE CARLO TRIALS EXAMPLE

MSF PERFORMANCE 7 OBJECTS EXAMPLE

SHORT RANGE

LONG RANGE

MSF PERFORMANCE 2 EMITTERS EXAMPLE

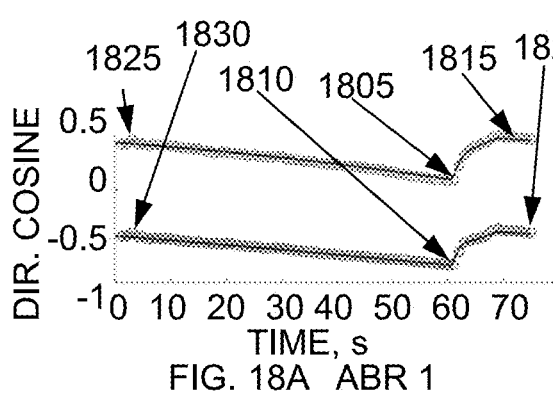
FIG. 18A  ABR 1
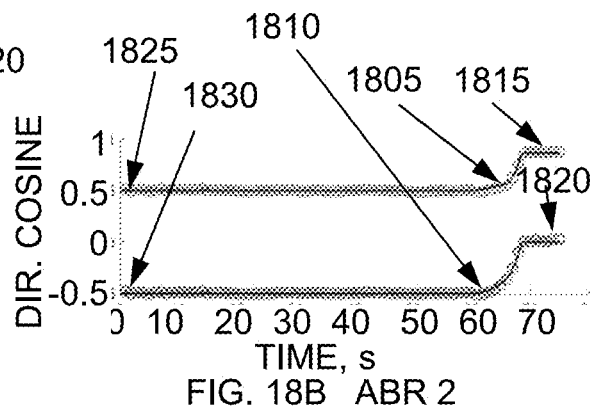
FIG. 18B  ABR 2
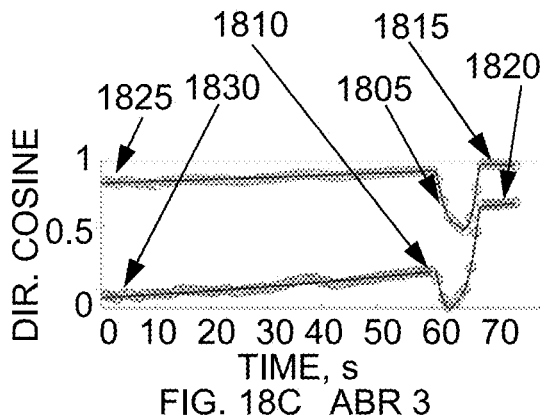
FIG. 18C  ABR 3
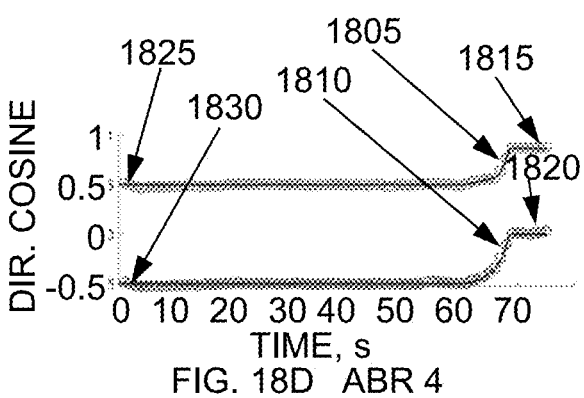
FIG. 18D  ABR 4
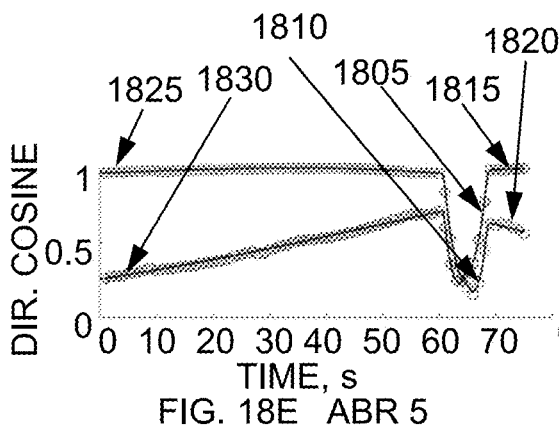
FIG. 18E  ABR 5
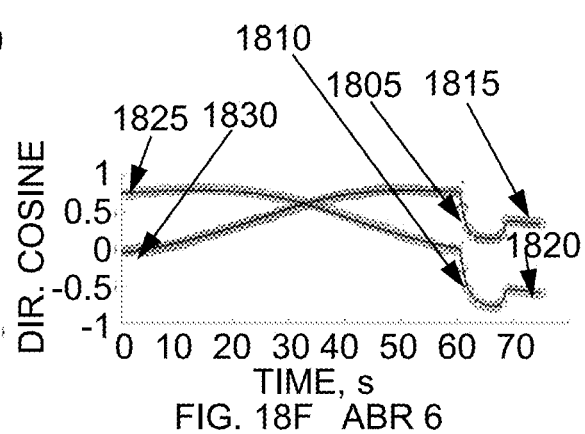
FIG. 18F  ABR 6
PKF DIRECTION COSINE AIRBORNE 2 ARRAYS EXAMPLE

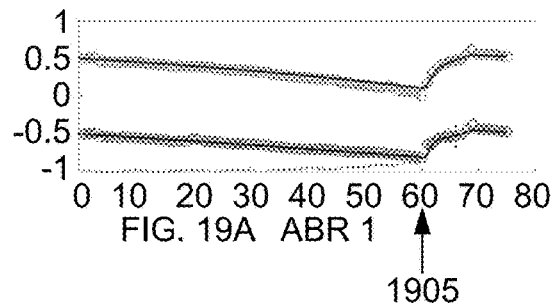
FIG. 19A  ABR 1
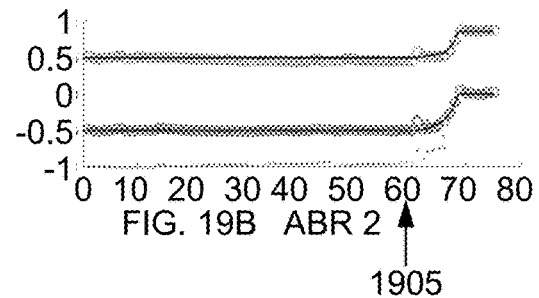
FIG. 19B  ABR 2
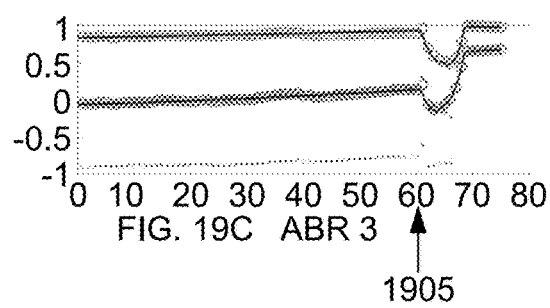
FIG. 19C  ABR 3
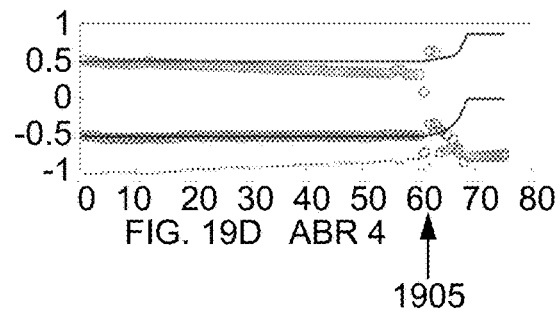
FIG. 19D  ABR 4
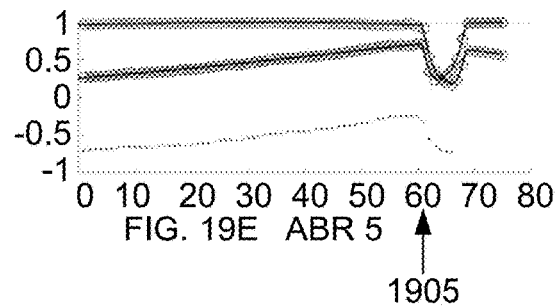
FIG. 19E  ABR 5
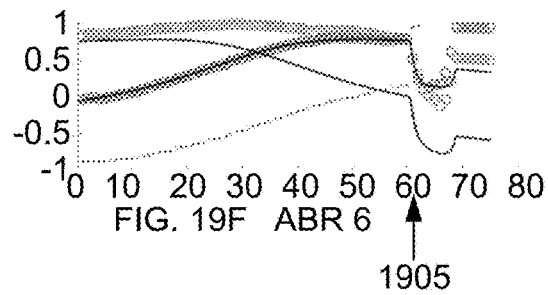
FIG. 19F  ABR 6
PKF DIRECTION COSINE AIRBORNE 1 ARRAY EXAMPLE

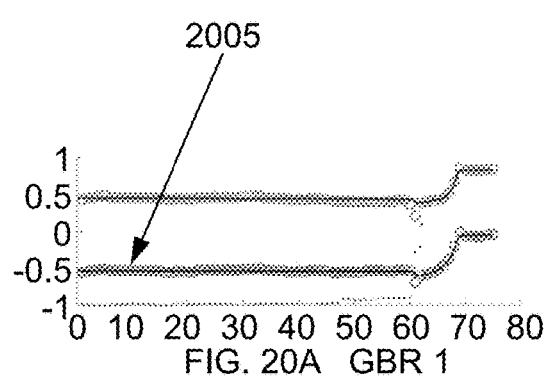
FIG. 20A GBR 1
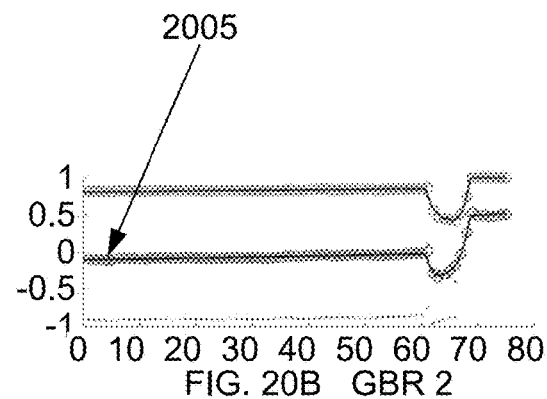
FIG. 20B GBR 2
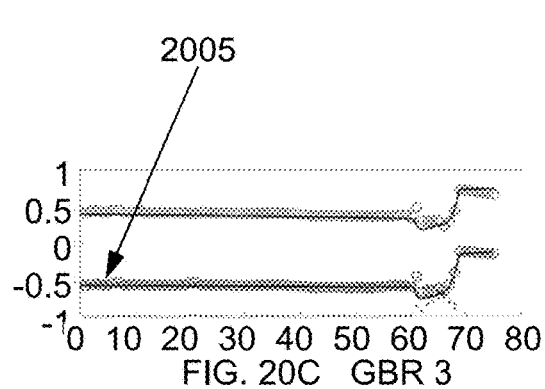
FIG. 20C GBR 3
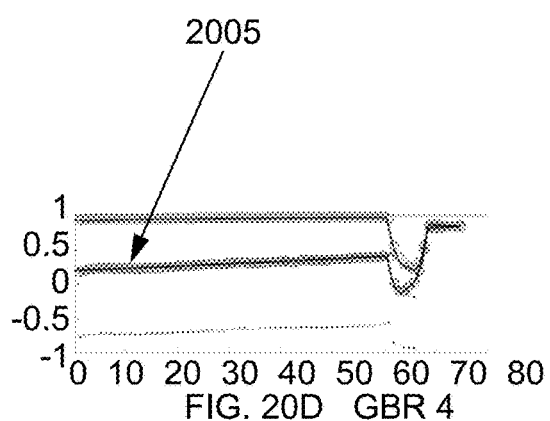
FIG. 20D GBR 4
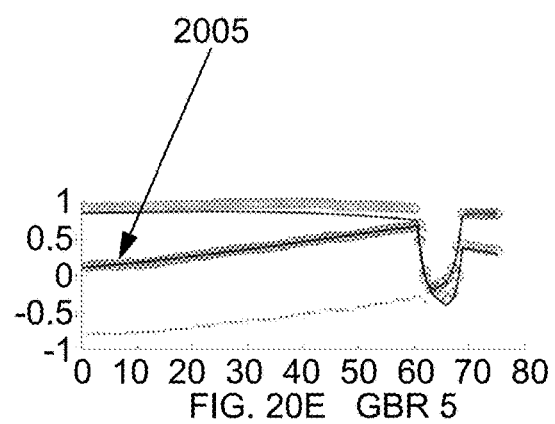
FIG. 20E GBR 5
PKF DIRECTION COSINE GROUND-BASED 1 ARRAY EXAMPLE

GENERALIZED ANGLE-BASED TRACKER (GABT)

FIELD

The following disclosure relates generally to emitter/target tracking and, more particularly, to single platform angle-based tracking of stationary or moving, earth or airborne objects.

BACKGROUND

Single platform sensor systems that only measure angle-based information, e.g., direction cosines, azimuth, and Time-Difference Of Arrival (TDOA), have limited instantaneous observability about the nature of the target being sensed. In particular, there is a limited ability to accurately determine if the target is a stationary object on the Earth's surface, a moving object on the Earth's surface, or is airborne using a single moment in time.

What is needed is a system and method to track emitters to determine their type (surface stationary, surface moving, or airborne), based on general angle information.

SUMMARY

An embodiment provides a system for a Radio Frequency (RF) generalized angle-based tracker using only angle-based information from a target emitter source, whereby a type of the target is determined comprising a memory storing instructions which when interpreted by the processor cause the processor to perform the steps of receiving signal data from a source target emitter signal; determining angle-based information for the target emitter source from the received signal; initializing a Stationary Surface Filter (SSF), a Moving Surface Filter (MSF), and a Pseudorange Kalman Filter (PKF) with the angle-based information; scoring the SSF and MSF by the PKF, whereby if the angle-based information is associated by exceeding a likelihood ratio threshold, then update the SSF, the MSF, and the PKF; determining if at least one plausible, nonzero likelihood, Constituent Kalman Filter (CKF) exists for each of the SSF and the MSF; if at least one plausible, nonzero likelihood, CKF exists for the SSF and no CKF exists for the MSF, then classify the target as a surface-level stationary target; if at least one plausible, nonzero likelihood, CKF exists for the MSF and no CKF exists for the SSF, then classify the target as a surface-level moving target; if no plausible, nonzero likelihood, CKF exists for both the SSF and the MSF, then classify the target as an airborne moving target; if the angle-based information is not associated, due to likelihood values of zero, then receive a subsequent signal from the target emitter source and determine angle-based information for the target emitter source from the received signal, and initiate the SSF, MSF, and PKF; whereby the type of the target is determined. In embodiments the angle-based information used to initialize the SSF comprises calculating a direction cosine, as measured from a front lobe source, from the angle-based information; and parameterize a line-of-sight via:

$$\ell_n = \begin{bmatrix} \sqrt{1 - u_1^2 - v_n^2} \\ u_1 \\ v_n \end{bmatrix}$$

where $\ell_n$ is a line of sight, $u_1$ is a single direction cosine measurement, and $v_n$ is an nth sampling of a parameterization variable. In other embodiments, the scoring of the SSF comprises extrapolating the CKFs of the SSF when a next measurement $u_k$ is received, and selecting a best scoring constituent filter. In subsequent embodiments the updating of the SSF comprises pruning by removing CKFs of the SSF with likelihood ratios below a specified threshold; and renormalizing weightings of remaining CKFs, following normalization during initialization. For additional embodiments the initialization of the MSF comprises initializing a velocity component of a covariance matrix P according to:

$$P_{vel} = \frac{s_{max}^2}{12} I_3$$

where $s_{max}$ is a maximum speed of a surface mover to be tracked, and $I_3$ is a three dimensional identity matrix. In another embodiment, updating of the MSF comprises pruning by removing CKFs with likelihood ratios below a specified threshold. For a following embodiment updating of the MSF comprises pruning by removing drifting CKFs. In subsequent embodiments, the initialization angle-based information is an individual direction-cosine measurement, $u_1$. In additional embodiments determining if at least one plausible CKF exists comprises calculating a CKF likelihood ratio and classifying the CKF as plausible if the likelihood ratio exceeds a threshold of 0.001.

Another embodiment provides a computer readable medium having instructions to perform the steps for a Radio Frequency (RF) generalized angle-based tracker using only angle-based information from a target emitter source, whereby a type of the target is determined comprising: receiving a source target emitter signal; determining angle-based information for the target emitter source from the received signal; initializing a Stationary Surface Filter (SSF), a Moving Surface Filter (MSF), and a Pseudorange Kalman Filter (PKF) with the angle-based information; scoring the SSF and MSF by the PKF, whereby if the angle-based information is associated by exceeding a likelihood ratio threshold, then update the SSF, the MSF, and the PKF; determining if at least one plausible, nonzero likelihood, Constituent Kalman Filter (CKF) exists for each of the SSF and the MSF; if at least one plausible, nonzero likelihood, CKF exists for the SSF and no CKF exists for the MSF, then classify the target as a surface-level stationary target; if at least one plausible, nonzero likelihood, CKF exists for the MSF and no CKF exists for the SSF, then classify the target as a surface-level moving target; if no plausible, nonzero likelihood, CKF exists for both the SSF and the MSF, then classify the target as an airborne moving target; if the angle-based information is not associated, due to likelihood values of zero, then receive a subsequent signal from the target emitter source and determine angle-based information for the target emitter source from the received signal, and initiate the SSF, MSF, and PKF; whereby the type of the target is determined. In included embodiments receiving of a signal from the target emitter source comprises constructing two baseline array vectors in y-z axes of an ownship, making angles of +30° and −30° with respect to the ownship body x-axis. In yet further embodiments the step of receiving a source target emitter signal from the target emitter source comprises maneuvering an ownship with respect to the target emitter source. In related embodiments determining angle-based information for the target emitter source from the received signal comprises no a-priori information. For further embodiments the angle-based information used to initialize the SSF comprises calculating a direction cosine, as measured from a rear lobe source, from the angle-based information; and parameterize a line-of-sight via:

$$\ell_n = \begin{bmatrix} -\sqrt{1 - u_1^2 - v_n^2} \\ u \\ v_n \end{bmatrix}$$

where $\ell_n$ is a line of sight, $u_1$ is a single direction cosine measurement, and $v_n$ is an nth sampling of a parameterization variable. In ensuing embodiments initializing the MSF comprises setting a maximum speed smax, of a surface mover to be tracked, to less than 31 $ms^{-1}$. For yet further embodiments, scoring of the SSF comprises selecting a best-scoring CKF of the SSF and using a Mahalanobis distance associated with that constituent filter for ellipsoidal gating. For more embodiments, determining if at least one plausible Constituent Kalman Filter (CKF) exists comprises calculating a CKF likelihood ratio and classifying the CKF as plausible if the likelihood ratio exceeds a threshold of 0.001. In continued embodiments the target is determined to be from an identified emitter type.

A yet further embodiment provides a method of signals tracking performing generalized angle-based tracking, using only angle-based information from a target emitter source, comprising receiving a source target emitter signal; determining angle-based information for the target emitter source from the received signal; initializing a Stationary Surface Filter (SSF), a Moving Surface Filter (MSF), and a Pseudorange Kalman Filter (PKF) with the angle-based information; scoring the SSF and MSF by the PKF, whereby if the angle-based information is associated by exceeding a likelihood ratio threshold, then update the SSF, the MSF, and the PKF; determining if at least one plausible, nonzero likelihood, Constituent Kalman Filter (CKF) exists for each of the SSF and the MSF; if at least one plausible, nonzero likelihood, CKF exists for the SSF and no CKF exists for the MSF, then classify the target as a surface-level stationary target; if at least one plausible, nonzero likelihood, CKF exists for the MSF and no CKF exists for the SSF, then classify the target as a surface-level moving target; if no plausible, nonzero likelihood, CKF exists for both the SSF and the MSF, then classify the target as an airborne moving target; if the angle-based information is not associated, due to likelihood values of zero, then receive a subsequent signal from the target emitter source and determine angle-based information for the target emitter source from the received signal, and initiate the SSF, MSF, and PKF; whereby a type of the target emitter source is determined. For additional embodiments, the signal is an RF signal.

Implementations of the techniques discussed above may include a method or process, a system or apparatus, a kit, or computer software stored on a computer-accessible medium. The details or one or more implementations are set forth in the accompanying drawings and the description below. Other features will be apparent from the description and drawings, and form the claims.

BRIEF DESCRIPTION OF THE DRAWINGS

FIGS. 9A and 9B depict an example weighted SSF estimate after the first and second measurements configured in accordance with an embodiment.

FIGS. 15A-15E depict an example of Monte Carlo trials for each emitter configured in accordance with an embodiment.

FIGS. 18A-18F depict an example of PKF direction cosine estimates for airborne radars using two baseline arrays configured in accordance with an embodiment.

FIGS. 19A-19F depict an example of PKF direction cosine estimates for airborne radars using a single baseline array configured in accordance with an embodiment.

FIGS. 20A-20E depict an example of PKF direction cosine estimates for ground-based radars using a single baseline array configured in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. More-over, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments provide a system and method that assesses two positive hypotheses for an emitter being located on the Earth's surface (stationary or moving). If the two hypotheses are rejected, then the null hypothesis of the emitter being airborne is accepted, providing a Generalized Angle-Based Tracker (GABT). The GABT combines a Stationary Surface Filter (SSF), a Moving Surface Filter (MSF), and a Pseudorange Kalman filter (PKF) to estimate the nature of the object being tracked. The coordinate system for embodiments is the Earth-Centered Earth-Fixed (ECEF) coordinate system. This coordinate system accounts for the spheroid Earth shape, has no special handling logic at the poles or at the international dateline, allows for straightforward calculations, and is compatible with multiplatform/networked/fusion type solutions.

Figure 1:
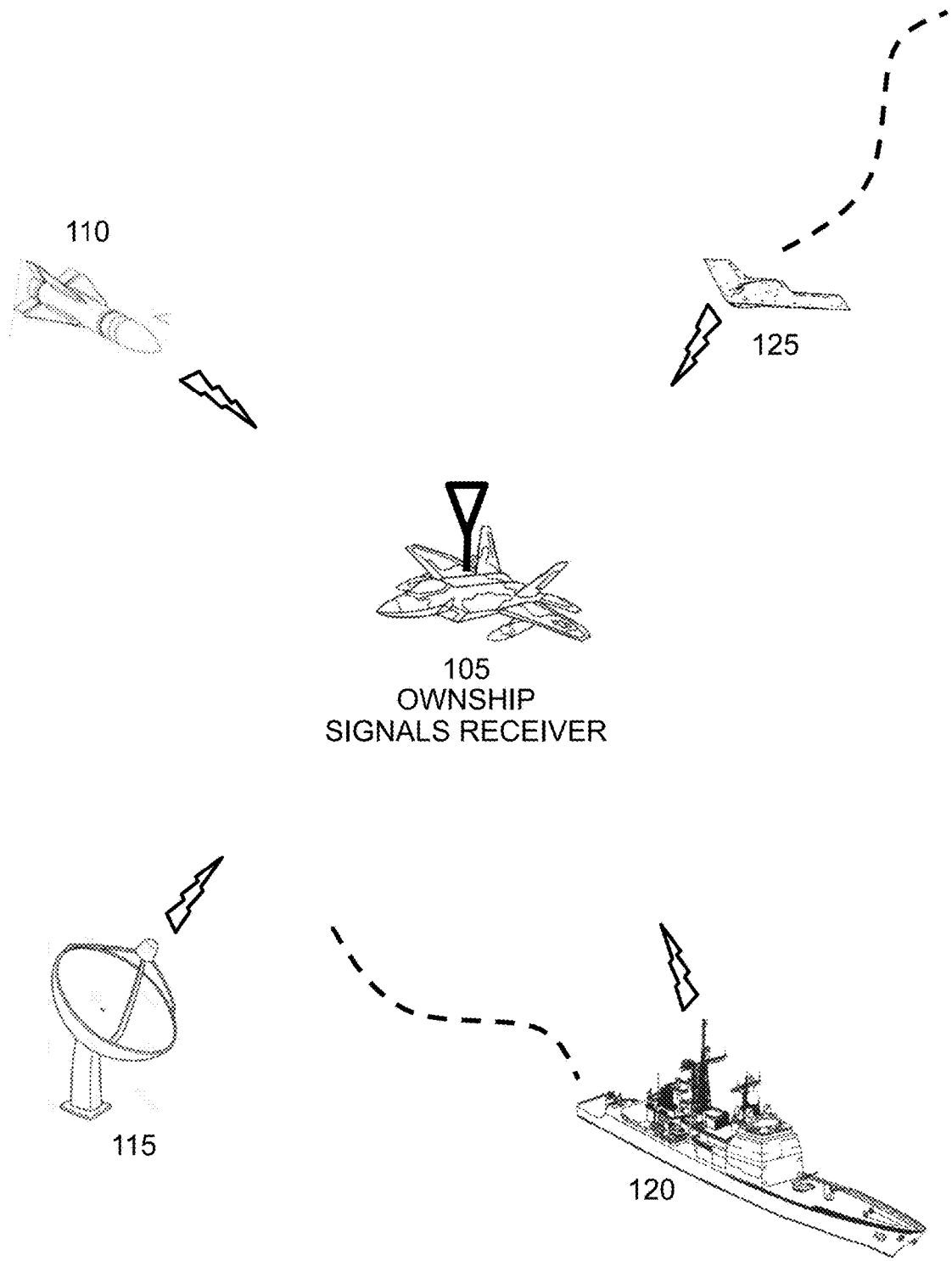
FIG. 1 depicts an exemplary environment of unknown emitters to track configured in accordance with an embodiment.

FIG. 1 depicts an exemplary environment 100 of unknown emitters to track. Embodiments operate in this environment, including signals receiver 105. One or more unknown emitters 110, 115, 120, and 125 transmits/transmit signals. While displayed examples depict RF emissions, any measurable signal can be processed by embodiments. As mentioned, tracked objects are categorized as one of three types: (1) stationary objects on the Earth's surface, (2) moving objects on the Earth's surface, or (3) moving airborne objects. Regarding stationary airborne objects such as hovering helicopters or aerostats, if it is hovering at low altitudes the algorithm estimates and classifies it as a stationary surface object, if it is observed while moving, then it will be classified as a moving airborne object. If it is flying slowly at low altitudes, it will be classified as a moving surface object. Depicted emitter examples include an airborne missile 110; a stationary Earth-based radar 115; a surface ship 120; and an aircraft/drone 125. Determination of object type is based on remaining plausible, nonzero, Constituent Kalman Filter (CKF) results as explained subsequently. Here, "plausible" refers to how well a measurement fits to the Kalman filter, in other words, its score defined by a likelihood ratio. In examples, a "plausibility threshold" for the score is 0.001. Above is plausible, below is not, resulting in removing or pruning. These concepts are detailed in the following sections. The term "constituent" of Constituent Kalman Filter refers to a set of filters, rather than one filter, since a single Kalman filter has a limited ability to accurately represent state information. The set of filters is part of a discretization strategy where each constituent is defined by a state vector estimate, a covariance matrix estimate, time, and normalized weighting ($\hat{x}_c$, $\hat{P}_c$, $t_c$, $\omega_c$). This concept is also detailed in following sections.

The Generalized Angle-based Tracker (GABT) uses the three filters mentioned above to perform tracking of the three "types" of emitters: stationary surface, moving surface, and airborne emitters using only angle-based information. For embodiments, angle-based information includes direction cosines, azimuth, and Time-Difference Of Arrival (TDOA) data. Each of these is determined as known in the art. The approach results in an estimate of which "type" given sufficient observability. Each filter, the stationary surface filter (SSF), moving surface filter (MSF), and pseudorange Kalman filter (PKF), is initialized with an angle measurement. The scoring is performed by the most general filter, the PKF. If the measurement is associated, it is used to update all three filters. "Associated" refers to a nonzero value for the likelihood ratio score of an angle-based measurement. The likelihood (or probability density function) is associated with a measurement innovation vector (discussed further later). The SSF (MSF) filter will remain active so long as the measurements are consistent with a stationary (moving) surface emitter, i.e., there is at least one plausible CKF. If either the SSF or MSF have no plausible CKFs left, then the corresponding hypothesis is rejected. The GABT does not have any interaction between the state estimates from the PKF, SSF, and MSF.

Figure 2:
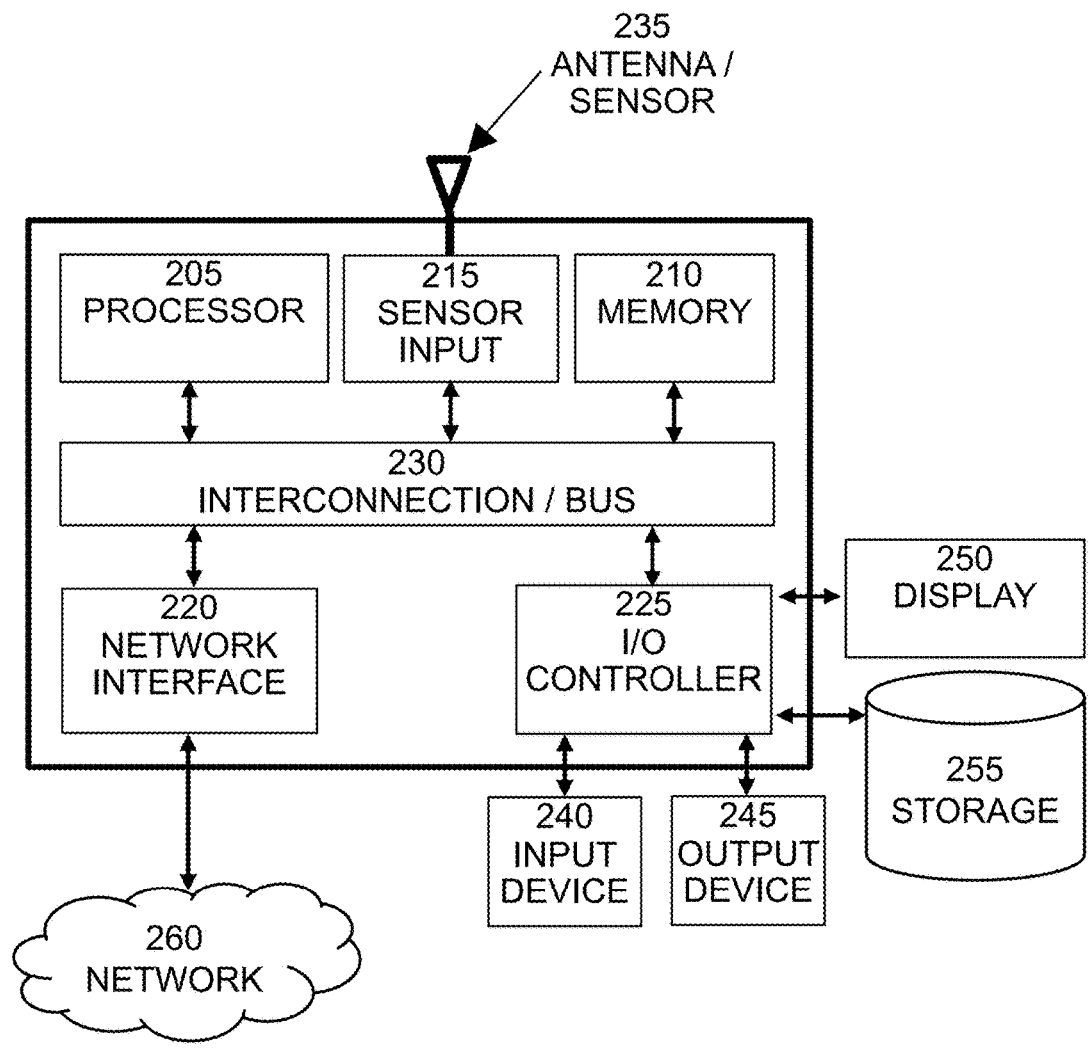
FIG. 2 depicts system components configured in accordance with an embodiment.

FIG. 2 illustrates an example system 200 according to one or more embodiments. System 200 may be a communication apparatus, such as a computer. System 200 includes, among other components, a processor 205, memory 210, sensor input 215, network interface 220, and I/O controller 225, each communicatively coupled to an interconnection/bus 230. An antenna/sensor 235 is coupled to sensor input 215. In embodiments, antenna/sensor 235 is an RF antenna/sensor, an optical sensor, or other parameter sensor to make measurements of emitting sources/targets. In embodiments, I/O controller 225 is communicatively coupled to one or more input devices 240, one or more output devices 245, one or more displays 250, and storage 255. Processor 205 is a hardware device for executing hardware instructions or software, particularly those stored in memory 210. The processor 205 may be a custom made or commercially available processor, a central processing unit (CPU), a microprocessor, or other device for executing instructions. Memory 210 may include one or combinations of volatile memory elements and nonvolatile memory elements. Additional data, including, for example, instructions for the processor 205 or other retrievable information, may be stored in storage 255, which may be a storage device such as a hard disk drive or solid state drive. In embodiments, a network interface 220 is connected to network 260 as might be employed in multiplatform/networked/fusion type embodiments.

GABT embodiments will be explained starting with a review of Kalman filters and an introduction to Gaussian summation for Kalman filter (GSKF). Next is described how the GSKF can be used as a Stationary Surface Filter (SSF) to test the most rigid hypothesis of the target being at a fixed location "near" the surface of the Earth. Here, "near" refers to an approximate elevation measurement for the line-of-sight intersection with the Earth's surface of the direction cosine. Ground elevation comes from the World Geodetic System (WGS84)—the global ellipsoid model reference coordinate system for GPS established in 1984. Calculations from the ground elevation and elevation measurement determine the "height rate". Embodiments softly enforce this "near" surface constraint using the pseudo-measurement of height-rate. For more detail, see the section on PRUNING OF "DRIFTING" CKFs, and equations 39 and 40. Furthermore, it is shown that this SSF produces an estimate of the target's location (i.e., performs geolocation) and that the errors of that estimate approach the Cramér-Rao lower bound. Continuing, the GSKF is again used, but this time to track targets that are moving on the Earth's surface; a Moving Surface Filter (MSF). This MSF formulation permits the tracking of targets constrained to motion along the Earth's surface, but does not require them to move in a straight line, i.e., the MSF follows surface targets that turn or accelerate. The null hypothesis is supported by a general angle-only state estimator that uses a pseudorange measurement. This pseudorange Kalman filter (PKF) is shown to work for tracking maneuvering airborne targets. The PKF is best supported when measurements from more than one (non-colinear) array are used to measure direction cosines. However, even if only one baseline array is measuring direction cosines, then a formulation with an approximate elevation measurement can be used with good success.

Figure 3:
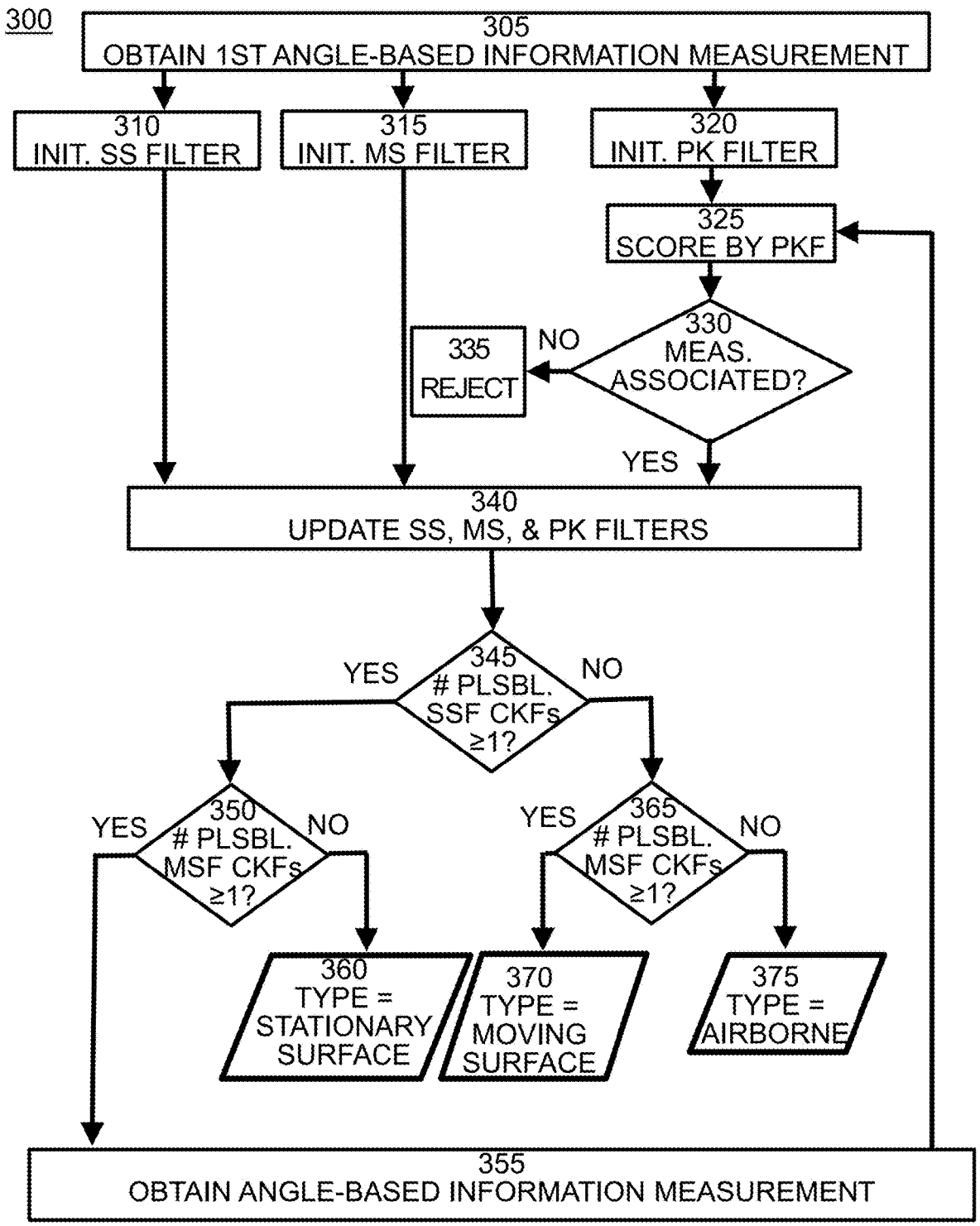
FIG. 3 is a flowchart for a method for determining an emitter type based on angle configured in accordance with an embodiment.

FIG. 3 a flowchart 300 for a method for determining, at a single sensor platform, a type of a target that is based only on angle measurements. Obtain a first angle-based information measurement 305; initiate a Stationary Surface Filter (SSF) 310; initiate a Moving Surface Filter (MSF) 315; initiate a Pseudorange Kalman Filter (PKF) 320; score (as detailed in the sections on Scoring) by PKF 325; check for association 330, meaning, if the measurement is not consistent with this track, the measurement is rejected, then go obtain the next angle-based measurement 335; if measurement is associated (nonzero likelihood), update SS, MS, and PK filters 340; is the number of plausible SSF CKFs greater than or equal to one? 345, if YES, is the number of plausible MSF CKFs greater than or equal to one? 350, if YES, obtain the next angle-based measurement 355, and return to score by PKF 325; if the number of plausible MSF CKFs is NOT greater than or equal to one, then the type of the target emitting the angle-based information measurement is Stationary Surface 360; if the number of plausible SSF CKFs is NOT greater than or equal to one 345, is the number of plausible MSF CKFs greater than or equal to one 365?; if the number of plausible MSF CKFs IS greater than or equal to one, then the type of the target emitting the angle-based information measurement is Moving Surface 370; if the number of plausible MSF CKFs is NOT greater than or equal to one, then the type of the target emitting the angle-based information measurement is Airborne 375.

Figure 4:
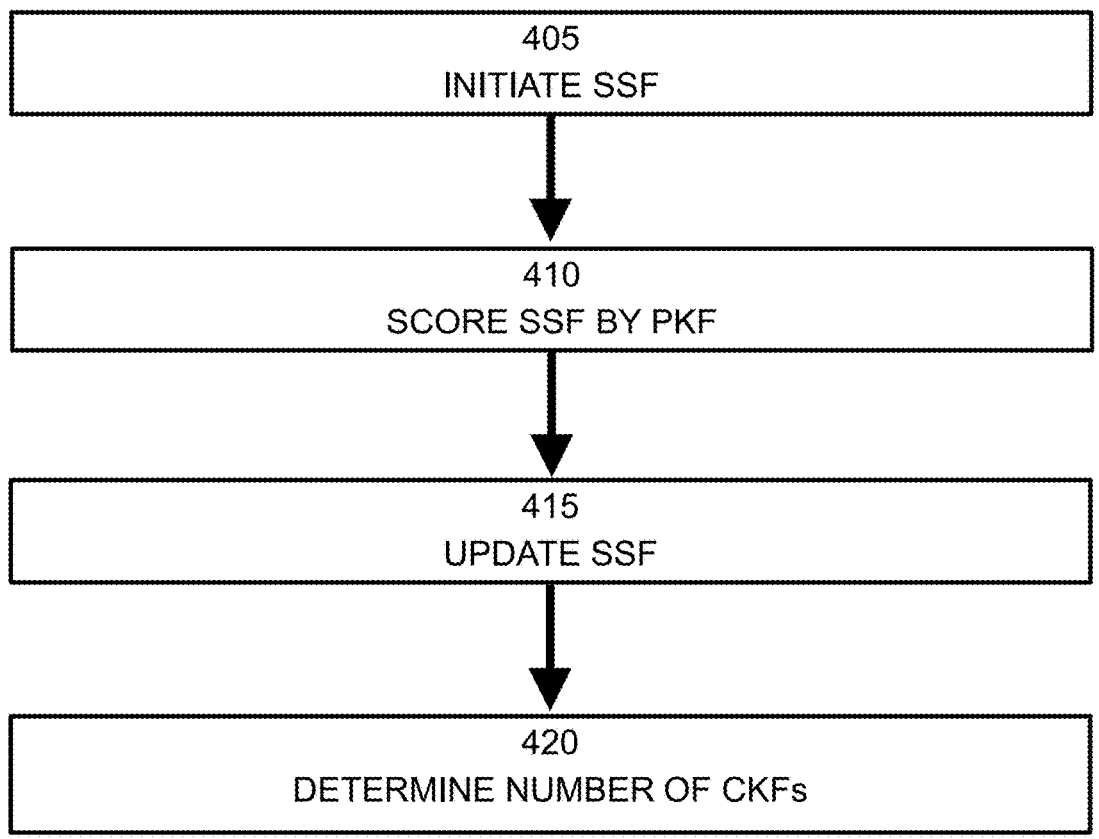
FIG. 4 depicts an SSF detail flowchart for a method configured in accordance with an embodiment.

FIG. 4 depicts an SSF detail flowchart 400. Steps comprise: initiating the SSF with angle-based information 405; scoring (as detailed in the sections on Scoring) the SSF by the PKF 410; updating the SSF 415; and determining the number of plausible SSF CKFs 420.

Figure 5:
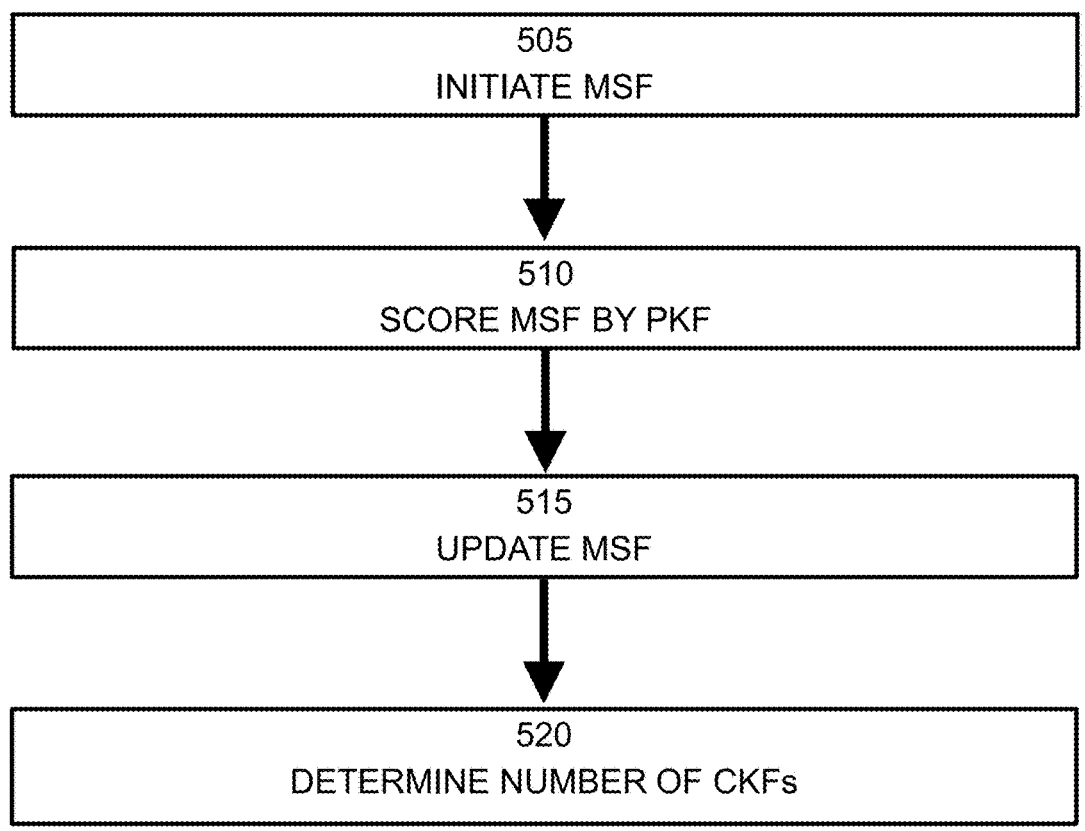
FIG. 5 depicts an MSF detail flowchart for a method configured in accordance with an embodiment.

FIG. 5 depicts an MSF detail flowchart 500. Steps comprise: initiating the MSF with angle-based information 505; scoring (as detailed in the sections on Scoring) the MSF by the PKF 510; updating the MSF 515; and determining the number of plausible MSF CKFs 520.

Figure 6:
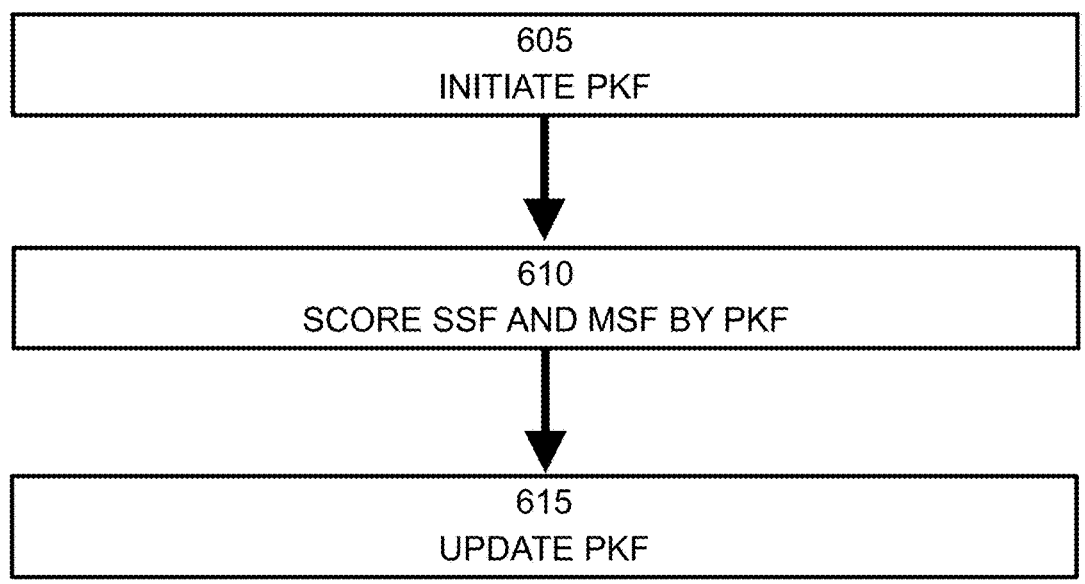
FIG. 6 depicts a PKF detail flowchart for a method configured in accordance with an embodiment.

FIG. 6 depicts a PKF detail flowchart 600. Steps comprise: initiating the PKF with angle-based information 605; using the PKF to score (as detailed in the sections on Scoring) the SSF and MSF 610; and updating the PKF 615.

Kalman Filters

As introduced, this section reviews Kalman filters that are used for tracking emitters. While there are many references that describe in great detail the theory and intricacies of Kalman filtering, here, notation is defined and some key points are highlighted. Embodiments are limited to discrete, rather than continuous, Kalman filters.

A Kalman filter starts with a desired state (or quantity) to be estimated. The N dimensional true state vector is denoted $x_k$, where the subscript k denotes the kth time index. The Kalman filter has an estimate of the state vector denoted by $\hat{x}_k$. Measurements that are a function of the state vector are observed. The M dimensional true measurement vector is denoted by $z_k$. The observation function that maps the state vector $x_k$ to the true measurement vector $z_k$ is h (·), i.e., $$z_k = h(x_k) \tag{EQ. 1}$$

The true measurement is not observed, rather it is corrupted by ever present noise. The unknowable M dimensional noise vector is denoted as $v_k$. The standard Kalman filter formulation assumes that the noise is normally distributed with zero mean and known covariance matrix $R_k$. Hence, $$\hat{z}_k = h(x_k) + v_k, \text{ where } v_k \sim \mathcal{N}(0, R_k) \tag{EQ. 2}$$

When there exists a matrix $H_k$ such that $h(x_k) = H_k x_k$, then the observation function is linear.

The Kalman filter is designed with a model for how the state vector changes from sample k to k+1. Furthermore, the model incorporates an uncertainty, which is frequently referenced as plant noise. The state system model is then given by:

$$x_{k+1} = \varphi(x_k) + q_k \tag{EQ. 3}$$

where $\varphi(\cdot)$ is some known function, and $q_k$ is a zero-mean, white Gaussian process noise with a covariance matrix $Q_k$. When there exists a matrix $\Phi_k$ such that $\varphi(x_k) = \Phi_k x_k$, then the state dynamics model is linear. Note that the Kalman filter model implies that both the measurement vector and the true state vector are (independent) Gaussian variables.

An important feature of the Kalman filter is that it combines measurement covariance matrices and the plant noise model to estimate a state covariance matrix, $\hat{P}_k$. The actual state covariance matrix is given by:

$$P_k \triangleq E\left[(x_k - \hat{x}_k)(x_k - \hat{x}_k)^T\right] \tag{EQ. 4}$$

Now specified is the triplet of information necessary to define a Kalman filter, chiefly a state vector estimate $\hat{x}$ and a covariance matrix estimate $\hat{P}$ at some time index or, more conveniently, some time stamp t. The triplet ($\hat{x}$, $\hat{P}$, t) combined with the dynamics and observation models define the Kalman filter.

Once initialized, the Kalman filter can be used to extrapolate the current estimate to a new (future) time, to score how well a measurement fits to the Kalman filter, and to update the Kalman filter with a new measurement.

The extrapolation of the estimated state vector for a linear dynamics model is just:

$$\hat{x}_{k+1|k} = \Phi_{k+1|k} \hat{x}_{k|k}, \tag{EQ. 5}$$

where the subindex k+1|k is used to indicate an extrapolation from time $t_k$ to $t_{k+1}$ and the subindex k|k is used to indicate that all the information up to and including the time $t_k$ have been incorporated. Likewise, the extrapolation of the estimated covariance matrix is given by:

$$\hat{P}_{k+1|k} = \Phi_{k+1|k} \hat{P}_{k|k} \Phi_{k+1|k}^T + Q_{k+1|k}. \tag{EQ. 6}$$

Then given a candidate measurement at time $t_{k-1}$, $\hat{z}_{k+1}$, with measurement covariance matrix $R_{k+1}$, one can score how well the Kalman filter "fits" with this measurement. The measurement predicted by the Kalman filter is given by $h(\hat{x}_{k+1|k})$. The difference between the measurement and this prediction is called the innovation vector:

$$\tilde{y} = \hat{z}_{k+1} - h(\hat{x}_{k+1|k}) \tag{EQ. 7}$$

Recalling, that the measurement and the state vector are being modeled as Gaussian, then one can define an innovation covariance matrix as:

$$\hat{S} = H \hat{P}_{k+1|k} H^T + R_{k+1} \tag{EQ. 8}$$

The innovation covariance matrix tells us what the expected variation in the innovation is supposed to be given both the measurement and estimated state vector covariance matrices. In particular, a statistical metric for the fit of the measurement can be defined via:

$$\delta^2 = \tilde{y}^T \hat{S}^{-1} \tilde{y} \tag{EQ. 9}$$

which is also known as the square of the Mahalanobis distance (smaller distance means better fit). This statistical metric is chi squared distributed with M degrees of freedom (assuming exact modeling), which means that an acceptance threshold can be set according to a desired probability for rejecting a measurement. However, this metric is not adequate when multiple Kalman filters are being evaluated as candidates for fitting a given measurement. Using the Mahalanobis distance based metric will result in a tendency to favor Kalman filters that have "large" covariance matrices. For example, consider two Kalman filters, $KF_1$ ($\hat{x}$, $\hat{P}$, t) and $KF_2$ ($\hat{x}$, $2\hat{P}$, t). In this case, the Mahalanobis distance for $KF_2$ will always be less than $KF_1$, but intuitively this is not desired because having the same innovation with a smaller covariance indicates a better prediction and differentiation capability. Using the likelihood of the fit to compare the Kalman filters will address this issue more satisfactorily.

The likelihood (or probability density function) associated with a measurement innovation vector $\tilde{y}$ is given by:

$$l = \frac{1}{|\hat{S}|^{1/2}(2\pi)^{M/2}} e^{-\frac{1}{2}\tilde{y}^T \hat{S}^{-1} \tilde{y}} \tag{EQ. 10}$$

$$= \frac{1}{|\hat{S}|^{1/2}(2\pi)^{M/2}} e^{-\frac{1}{2}\delta^2} \tag{EQ. 11}$$

If one considers the pathological extension of the example of $\delta=0$, which is true for both $KF_1$ and $KF_2$, we can see that the likelihood of $KF_1$ is larger than the likelihood of $KF_2$, as desired.

The likelihood of each measurement used to update a Kalman filter can be calculated and denoted as $l_k$. Then a cumulative likelihood for the track using measurements 1 through k would be given by:

$$L_k = \prod_{n=1}^{k} l_k \tag{EQ. 12}$$

For numerical precision considerations (and for traditional notation reasons), the likelihood quantities are converted to negative log likelihood values resulting in:

$$\ell \triangleq -\log l \tag{EQ. 13}$$

$$= \frac{1}{2}\left(M \log(2\pi) + \log|\hat{S}| + \delta^2\right) \tag{EQ. 14}$$

and $$\mathcal{L}_k \triangleq -\log L_k \tag{EQ. 15}$$

$$= \sum_{n=1}^{k} \ell_k \tag{EQ. 16}$$

The key limitation of the Kalman filter of interest for the discussion is that it is limited to representing information uncertainty that is well characterized by an ellipse (or ellipsoid). The information about an emitter located on the Earth's surface is represented (approximately) by a hyperbola when using a single angle measurement. Hence, a standard Kalman filter will do a poor job at representing this information. This motivates the introduction of the Gaussian summation of Kalman filters introduced in the subsequent section.

Gaussian Summation for Kalman Filters

The limited ability of a single Kalman filter to accurately represent state information in some situations can be addressed in multiple ways. Here, an approach that discretizes the information into a set of Constituent Kalman filters that in total accurately represent the state information but individually each only represents a localized amount of information is used. This formulation is an extension of the Kalman filter in the previous section. This approach is called a Gaussian summation Kalman filter or GSKF.

To start, assume a discretization strategy has been defined that uses C Kalman filters. The discretization strategy must also define the relative weighting of each constituent Kalman filter, i.e., Constituent Kalman filter (CKF) c or $KF_c$ is defined by the quartet ($\hat{x}_c$, $\hat{P}_c$, $t_c$, $\omega_c$). For simplicity, it is assumed that each CKF utilizes the same dynamics model and the time of each constituent filter $t_c$ is common. A weighted average of the CKFs can be computed to generate a single state vector and covariance matrix for output/interface purposes. The weighted average state vector is given by:

$$\hat{\bar{x}} = \sum_{c=1}^{C} w_c \hat{x}_c \tag{EQ. 17}$$

where $\omega_c$ are the normalized weightings of the constituents, i.e., $\Sigma_{c=1}^{C} \omega_c = 1$ and $0 \leq \omega_c \leq 1$. Similarly, the weighted average covariance matrix is given by:

$$\bar{P} = \sum_{c=1}^{C} w_c \left(\hat{P}_c + (\hat{x}_c - \hat{\bar{x}})(\hat{x}_c - \hat{\bar{x}})^T\right) \tag{EQ. 18}$$

The weighting of the constituents can be determined by the cumulative likelihoods that belong to each CKF, i.e.:

$$w_{k,c} = \frac{L_{k,c}}{\sum_{i=1}^{C} L_{k,c}} \tag{EQ. 19}$$

where $L_{k,c}$ denotes the cumulative likelihood of cth CKF filter up to and including the kth measurement.

The fundamental operations of a Kalman filter, extrapolation, scoring, and updating, are utilized by each CKF. For embodiments, the next section describes how the scoring of candidate measurements can be used to prune low information or inconsistent CKFs.

Stationary Surface Filter (SSF) Description

Now the GSKF approach is applied to the problems of state estimation and data association scoring with direction of arrival measurements for estimating the location of stationary emitters located near the Earth's surface. The GSKF will be used to specify the stationary surface filter (SSF).

System Model

Each CKF has a three dimensional state vector, $\hat{x}$, that corresponds to a position vector in Earth-centered Earth-fixed (ECEF) coordinates. Naturally, the state transition matrix, $\Phi$, is the three dimensional identity matrix, $I_3$. For the plant noise model, we use a simple constant of $Q=\sigma_q^2 I_3$, where $\sigma_q$ is some value (in meters) that represents some finite, but probably small, value for any limitations in estimating the position.

Initialization

The initialization of the SSF starts with a single direction cosine measurement, $u_1$. The cone defined by this measurement can be parameterized by the variable v, where $v^2 \leq 1 - u_1^2$. The parameterization space is uniformly sampled N+1 times, i.e.:

$$v_n = (1-u_1^2)^{1/2}(-1+n/N) \tag{EQ. 20}$$

where n=0, 1, ..., N. This parameterization of v results in a line-of-sight parameterization, which is given by:

$$\ell_n = \begin{bmatrix} \sqrt{1-u_1^2-v_n^2} \\ u_1 \\ v_n \end{bmatrix} \tag{EQ. 21}$$

For each line-of-sight, $\ell_n$, an intersection with the Earth's surface is determined, which is denoted as $p_n$. For some values of n there is no intersection of the ray with the Earth surface, those samples are discarded and we are now left with C≤N samples. The parameterizations are sorted by the range from the ownship, so that $r^1 \leq r_2 \leq \ldots \leq r_c$, where $r_c$ is the (slant) range from the ownship to the intersection sample $p_c$.

We use engineering judgment and associate with each $p_c$ a measurement standard deviation of:

$$\sigma_{v_c} = \frac{1}{2} \min(|v_{c+1} - v_c|, |v_{c-1} - v_c|) \tag{EQ. 22}$$

Then, for each parameterization, an unscented transformation procedure is used to estimate a position, $\hat{p}_c$, and covariance matrix, $\hat{P}_c$, that belong to each respective CKF. As known to one of skill in the art of probability theory, an unscented transform is a mathematical function for estimating the result of applying a given nonlinear transformation to a probability distribution; it is characterized only in terms of a finite set of statistics. Without any reason to prefer one parameterization solution over another, we set the weights of each to be the same, i.e., $\omega_c = 1/C$, for the initialization of the SSF implementation of a GSKF.

The above initialization procedure assumed that the measurement of the direction cosine was from a source that is in the "front lobe" of the antenna array, i.e., $\ell^T e_1 > 0$, where $e_m$ denotes a vector of zeros, except in the mth entry where there is a one. This assumption of being in the "front lobe" might not be available in some situations. If it is not, then the above procedure is repeated again for the "back lobe" hypothesis by using the same parameterization for v but using:

$$\ell_n = \begin{bmatrix} -\sqrt{1-u_1^2-v_n^2} \\ u \\ v_n \end{bmatrix} \tag{EQ. 23}$$

Scoring

When the next measurement $u_k$ is received, the CKFs are extrapolated to the measurement time and scored. There are several reasonable choices for scoring, e.g., the mean or weighted average. Embodiments choose the scoring for the SSF to be that of the best scoring constituent filter and use the Mahalanobis distance associated with that constituent filter for ellipsoidal gating.

Updating and Pruning of Low Likelihood CKFs

The updating of the SSF with a measurement proceeds by first examining the updated likelihoods for each CKF. The likelihood of the cth CKF after scoring the newly associated measurement k is denoted as $L_{k,c}$. The following likelihood ratio is computed:

$$\tau_{k,c} = \frac{L_{k,c}}{L_{k,c^*}} \tag{EQ. 24}$$

where c* is the index of the highest CKF likelihood. Note that $0 \leq \tau_{k,c} \leq \tau_{k,c^*} = 1$. CKFs with likelihood ratios below a specified threshold (e.g., 0.001) are removed, leaving C' CKFs. If C' is zero, then the SSF has rejected the hypothesis that the collection of measurements associated together belongs to a single stationary emitter. Otherwise, the remaining CKFs have their associated weightings $\omega_c$ renormalized. Each CKF proceeds with the standard Kalman filter update calculations.

Pruning of "Drifting" CKFs

It is possible that the emitter is being observed at a very high rate and/or is slowly moving, which would result in the CKF state vector slowly drifting over time (the addition of plant noise allows this to happen). One approach to account for this is to compare the state vector of the CKF at or near initialization (denoted as $\hat{x}_{0,c}$) with the current (later) state vector (denoted as $\hat{x}_{k,c}$) of the same CKF. The statistical difference between these two estimates should be sufficiently small. A statistical measure of the difference is given by:

$$\delta_{k,c} = \frac{1}{2}(\hat{x}_{0,c} - \hat{x}_{k,c})^T (\hat{P}_{0,c} + \hat{P}_{k,c})^{-1} (\hat{x}_{0,c} - \hat{x}_{k,c}) \tag{EQ. 25}$$

where $\hat{P}_{0,c}$ and $\hat{P}_{k,c}$ are the estimated covariance matrices associated with state vectors $\hat{x}_{0,c}$ and $\hat{x}_{k,c}$, respectively. If the measurements follow the stationary surface emitter model, then an approximation for the distribution of the statistical distance metric $\sigma_{k,c}^2$ is a chi-squared distribution with three degrees of freedom, provided that k»0. For this distribution, we expect that $\sigma_{k,c}^2 < 16.2$ will happen 99.9% of the time. If $\sigma_{k,c}^2 > 16.2$, then we can discard the CKF and renormalize the weightings of the remaining CKFs.

Pruning of "Redundant" CKFs

As measurements are made, depending on the number of CKFs and their relative proximity, it is possible that after the updating procedure, pairs of CKFs are statistically indistinguishable, i.e., CKF redundancy. The difference between CKF $c_1$ and $c_2$ after the kth update can be measured by the statistical difference metric:

$$\delta_{k,c_1,c_2}^2 = \frac{1}{2}(\hat{x}_{k,c_1} - \hat{x}_{k,c_2})^T(\hat{P}_{k,c_1} + \hat{P}_{k,c_2})^{-1}(\hat{x}_{k,c_1} - \hat{x}_{k,c_2}) \quad \text{(EQ. 26)}$$

When $\delta_{k,c_1,c_2}^2$ is sufficiently small, then the CKFs can be merged, which reduces the number of CKFs being maintained by the SSF. The cost of redundancy is mainly computational, so a relatively small threshold is used so that there is high confidence in the redundancy of two CKFs before merging. An example threshold is 1.0. If a redundancy is found, then the CKF with the highest likelihood is retained and the lower likelihood CKF is pruned or discarded.

SSF Performance Examples Versus Stationary Surface Emitters

In this section, several example scenarios are considered to demonstrate the performance of the SSF described in the previous section. In all of the scenarios, the ownship flies east to west in a straight level flight at 306 ms$^{-1}$ for about 60 s before pulling a 3 g coordinated level altitude turn for 8 s, followed by a peak 3 g thrust/burn for approximately 7 s. The emitter is observed at a 1 Hz rate and measurements of direction cosine with 1° of standard deviation are generated by one of two arrays on an alternating basis. The array baseline vectors are in the ownship body y-z plane and make angles of +30° and −30° with respect to the body x axis (x axis is generally aligned with the velocity vector).

Figure 7:
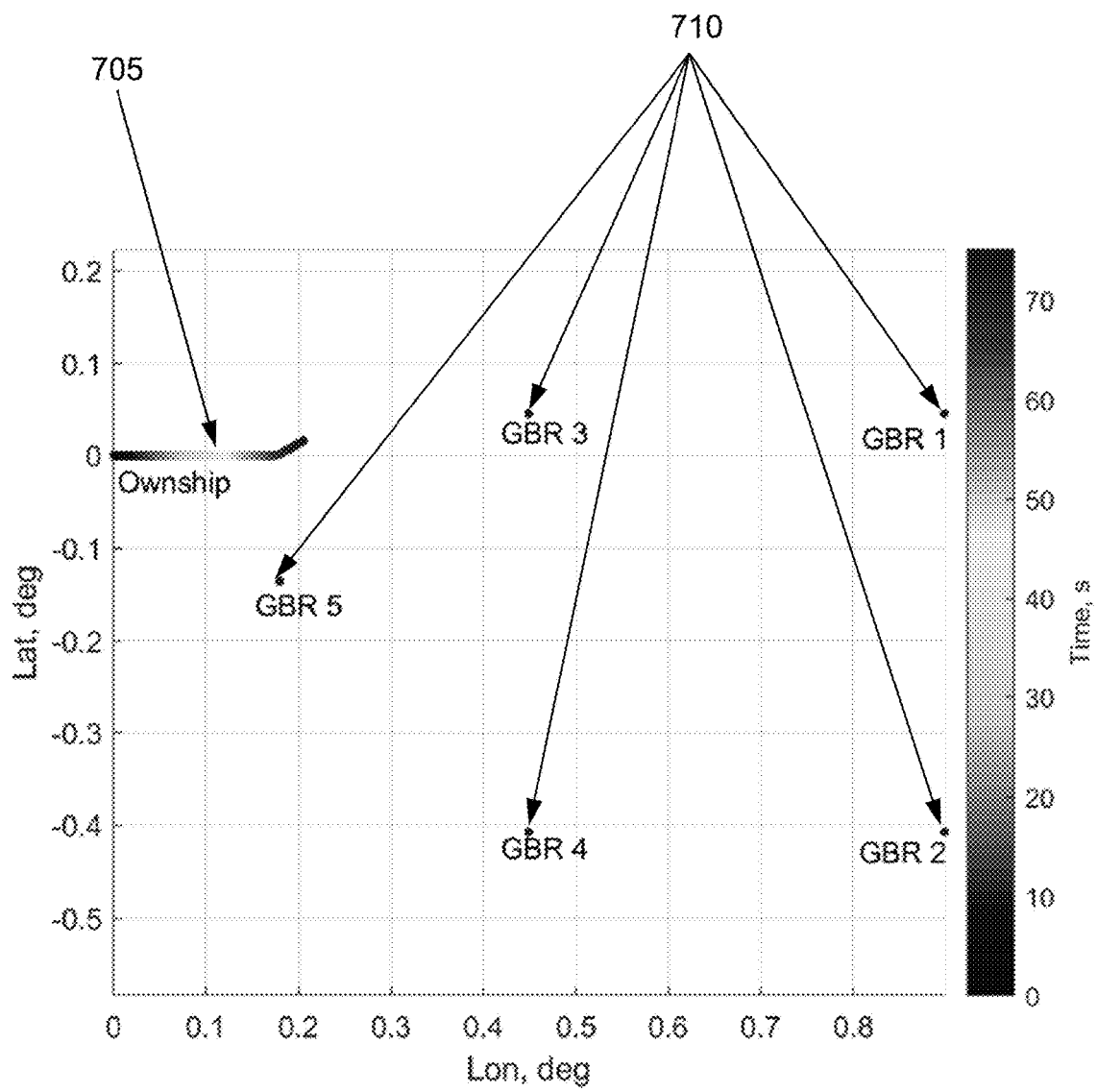
FIG. 7 depicts example ownship trajectory and stationary surface emitter positions configured in accordance with an embodiment.

FIG. 7 shows the above described ownship example position/trajectory 700 with respect to the stationary surface emitter positions for five different emitter locations. Ownship position 705 is depicted, timewise, from left to right. Latitude and longitude for the five stationary Ground Based Radar (GBR) surface emitters (GBR 1, GBR 2, GBR 3, GBR 4, and GBR 5) are depicted as points 710.

Figure 8A:
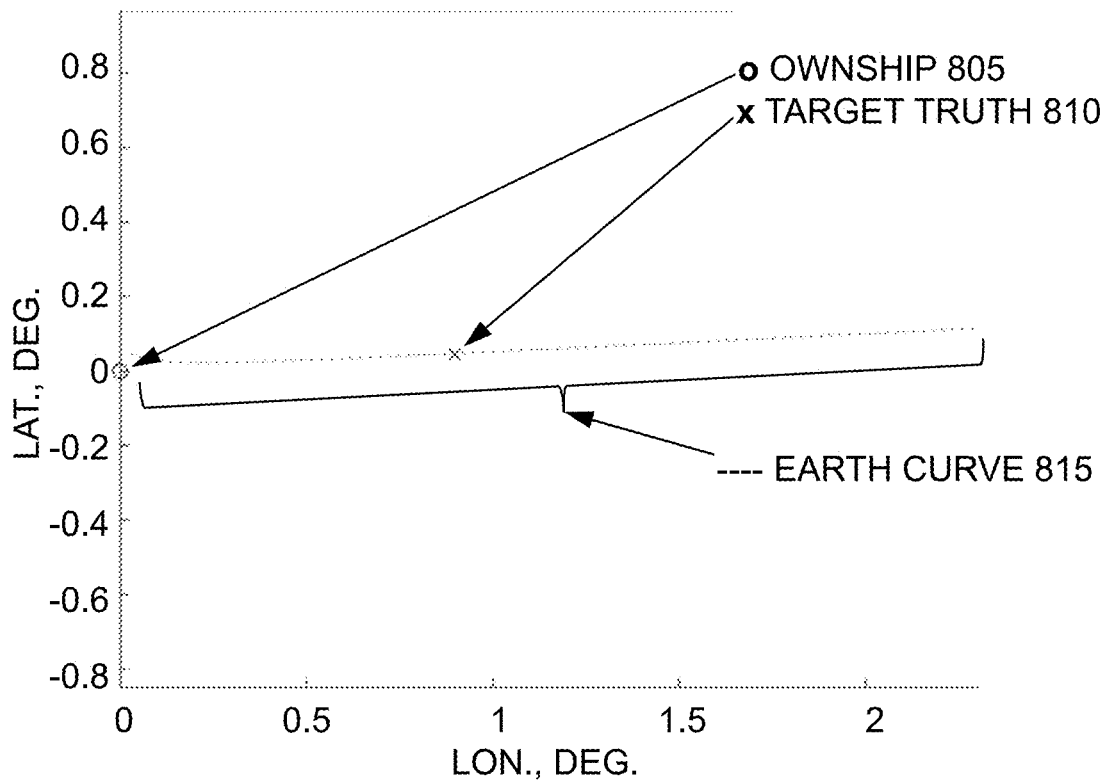
FIGS. 8A and 8B depict an example ownship position at time of first measurement and CKF positions configured in accordance with an embodiment.
Figure 8B:
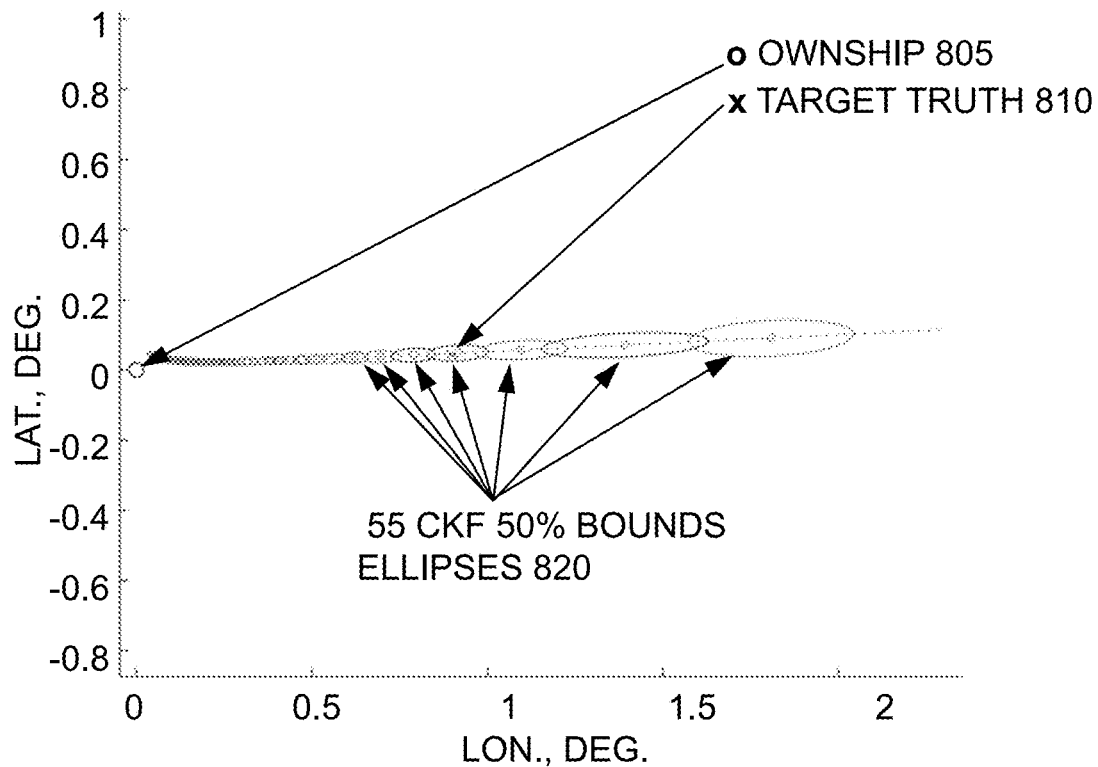

FIGS. 8A and 8B depict positions for an initialization example for the emitter labeled GBR 1 in FIG. 7. FIG. 8A shows ownship position 805 at the time of first measurement, target truth position 810, and the curve on the earth surface 815 which is consistent with the first direction cosine measurement. The emitter labeled ground based radar (GBR) 1 in FIG. 7 is considered first. This example measurement is depicted by the previously mentioned line 815 in FIG. 8A. The SSF initializes 55 CKFs with example covariances depicted by their 50% bounds indicated by ellipses 820 in FIG. 8B. This initialization example assumes that the emitter is in the "front lobe" of the array.

FIGS. 9A and 9B depict the weighted SSF estimate after the first and second measurements. The SSF weighted average mean and covariance is added in FIG. 9A. FIG. 9A depicts ownship position 805, target truth position 810, and estimate covariance 905. After the second measurement, the number of particles is reduced 910 from 55 to the 25 as shown in FIG. 9B.

Figure 10A:
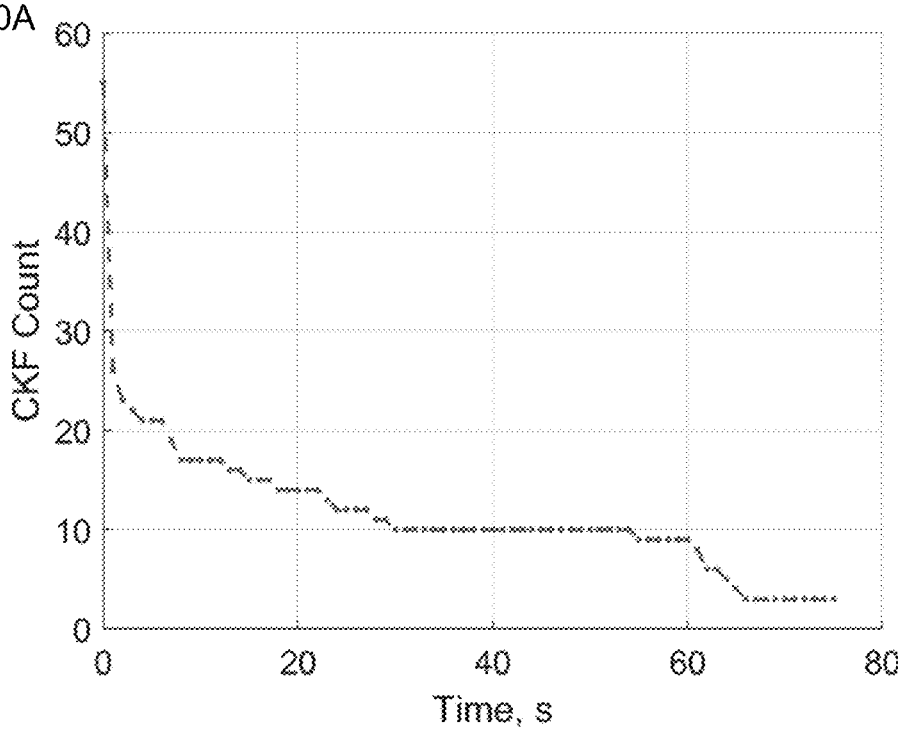
FIGS. 10A and 10B depict an example of SSF characteristics over time configured in accordance with an embodiment.
Figure 10B:
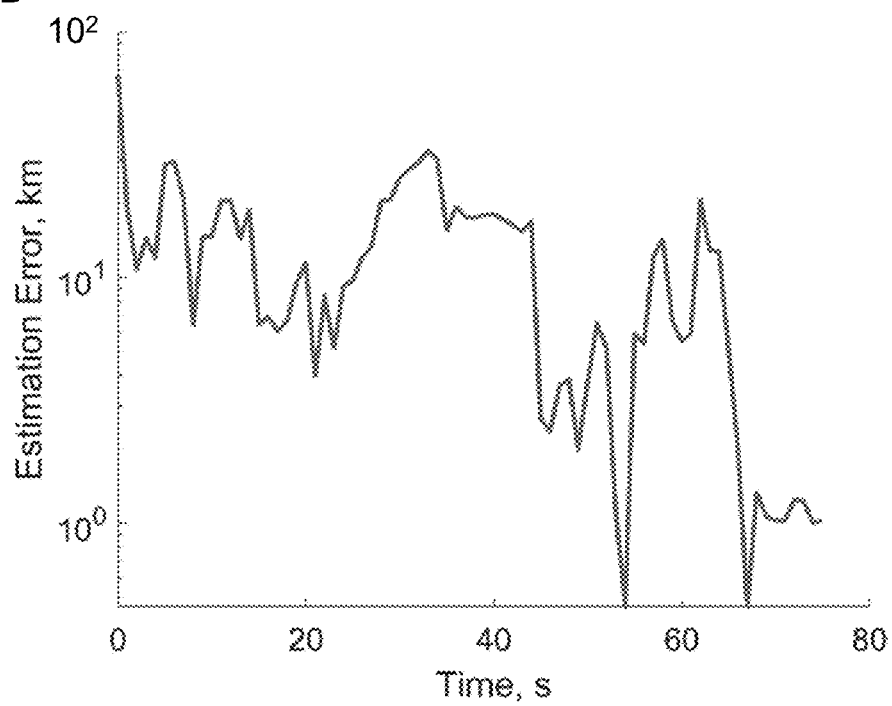

FIGS. 10A and 10B are examples of the SSF characteristics over time. FIG. 10A shows that the number of CKFs being discarded continues as more measurements update the SSF, but the number of CKFs reduces at a slower rate. Note that between the time of 60 s and 65 s, a large fraction of the CKFs (5 of 10) are discarded. This is due to the increased observability afforded by the ownship maneuver that occurs during this time. The estimation error versus time graph of FIG. 10B shows an error decrease from just under $10^2$ to $10^0$ after 65 seconds. At the end of this analysis, there are just three CKFs.

The graph of FIG. 10B is the SSF estimated location error $\varepsilon_k$ at update k, defined by:

$$\varepsilon_k = \|\bar{x}_k - x\| \quad \text{(EQ. 27)}$$

Figure 11:
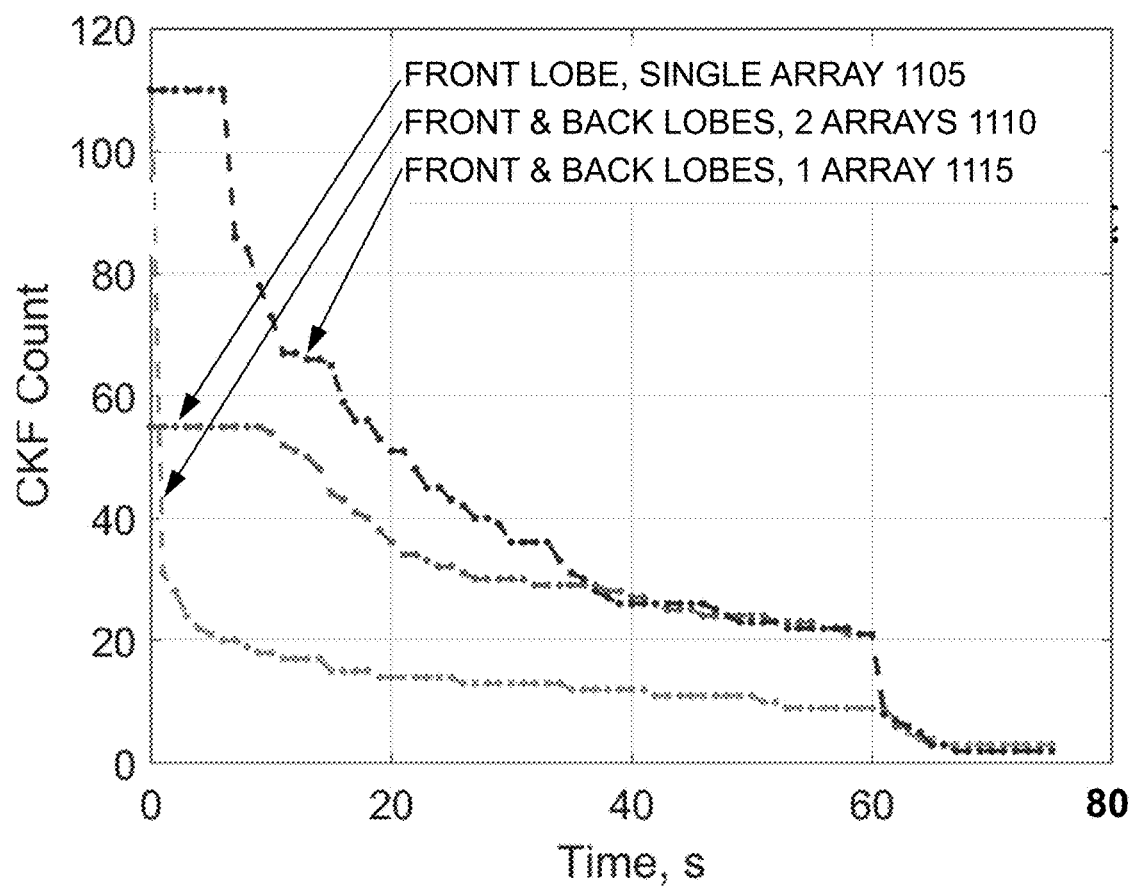
FIG. 11 depicts an example of CKF profile variability versus time depending on the conditions configured in accordance with an embodiment.

The number of CKFs versus time is a strong function of the following:
Number of parameterizations of the line-of-sight
Just "front and back lobe" vs. only "front lobe"
Single array or multiple arrays
Ownship maneuvering
Ownship trajectory FIG. 11 depicts the CKF versus time profile variability 1100 depending on the conditions. Three conditions are depicted: front lobe, single array 1105, front and back lobes, two arrays 1110, and front and back lobes, one array 1115. For example, if only a single array is considered 1105, 1115, then the number of CKFs does not have the large initial drop seen when two arrays are used 1110. Alternatively, if the hypothesis is allowed to include the possibility of the emitter being in the "back lobe" 1110, 1115, then the number of CKFs are much higher initially.

An important consideration is how well embodiments compare with the optimal estimator. The optimal estimator performance can be estimated via a covariance-based analysis that utilizes truth information for computing the linearization of the observation matrices. This lower bounding covariance matrix is called the Cramér-Rao lower bound (CRLB) for this type of estimation problem, and is denoted as $P_{CRLB}$.

Figure 12:
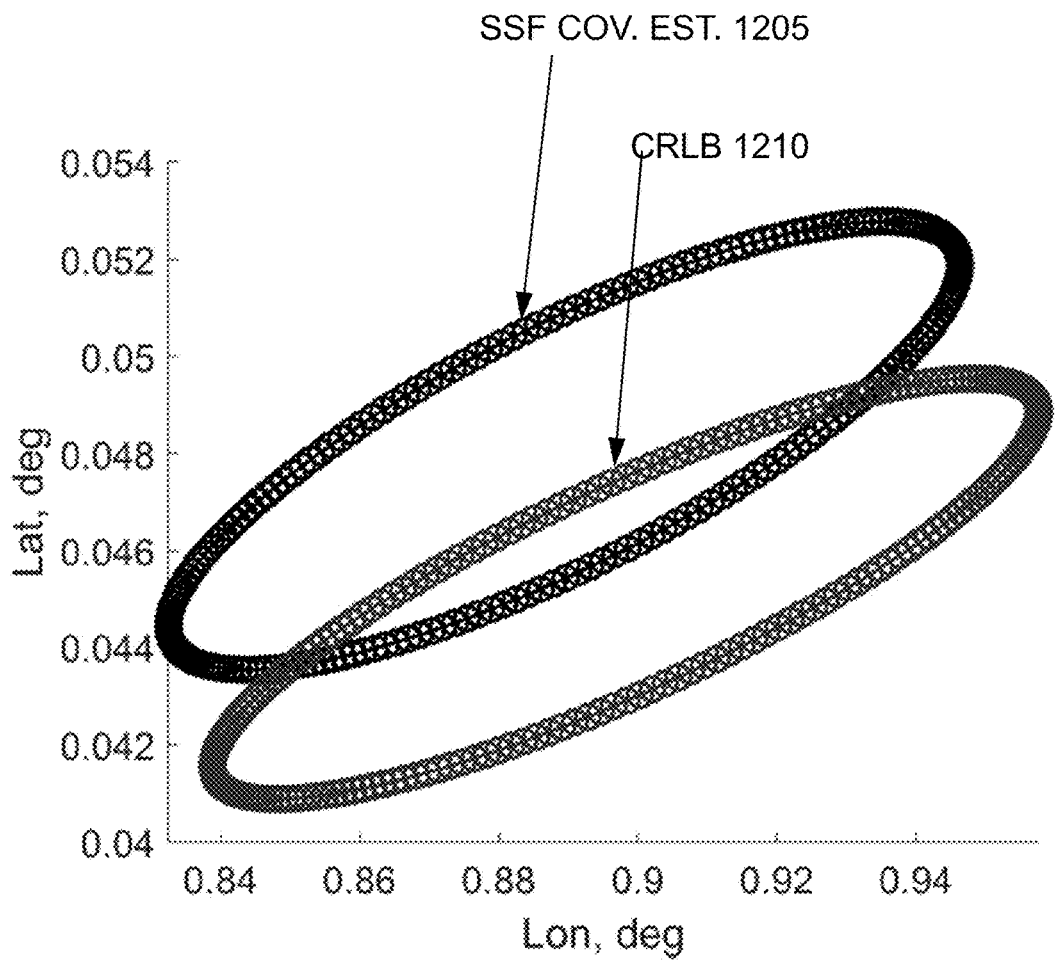
FIG. 12 depicts an example comparison of true CRLB and estimated 50% covariance matrices configured in accordance with an embodiment.

FIG. 12 depicts a comparison of the CRLB and estimated covariance matrices 1200 at the end of the above scenario. The ellipses are the 50% covariance matrix bounds. The SSF estimated covariance matrix 1205 is slightly bigger than the CRLB 1210. The true and estimated target positions are at the center of the 1210 and 1205 ellipses, respectively. The distance between the ellipse centers is the estimation error. The fact that the 1205 error ellipse nearly captures the center of the 1210 ellipse indicates that the estimated SSF covariance matrix is an accurate representation of the error. A more thorough analysis will be presented later.

Figure 13:
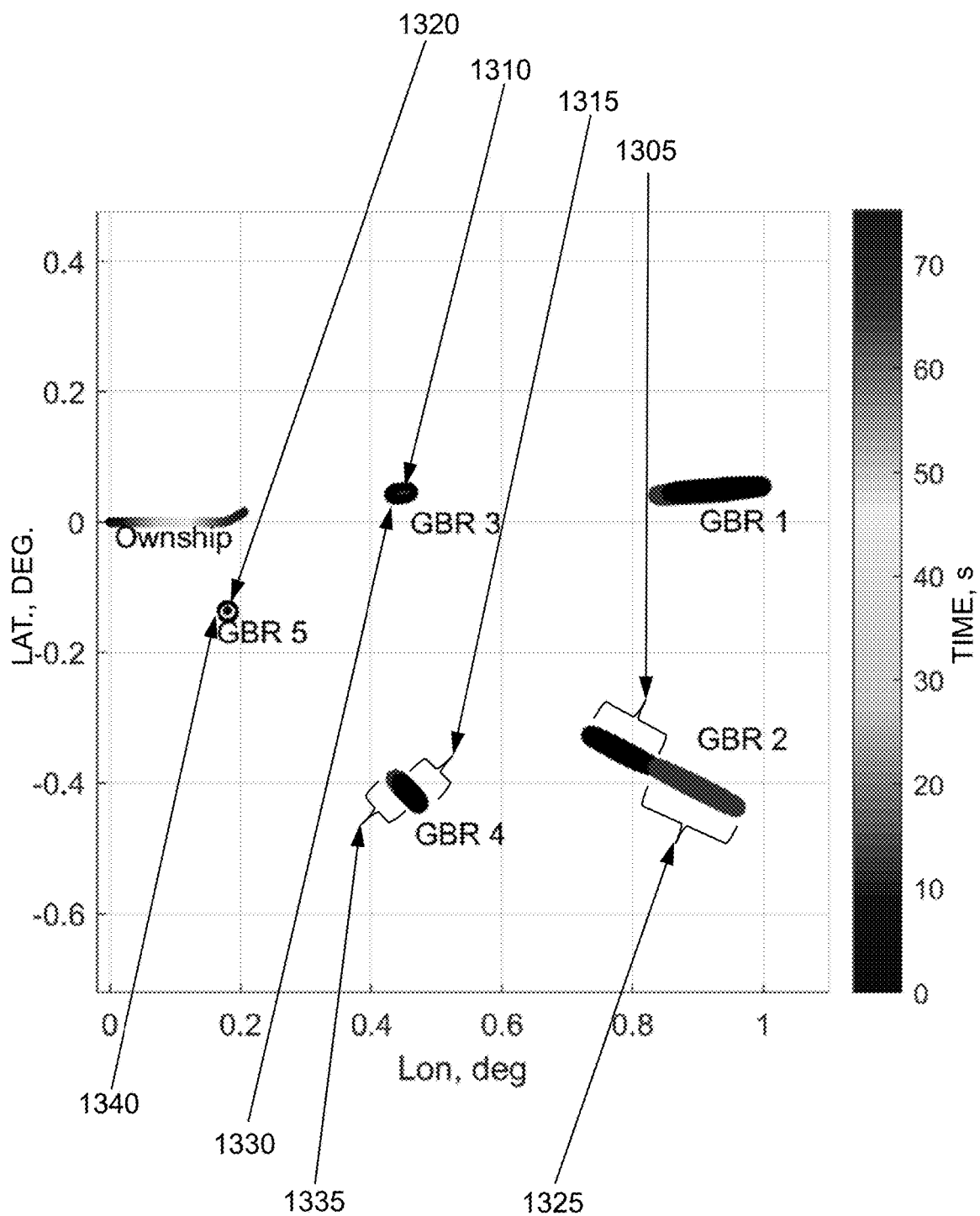
FIG. 13 depicts an example of 50% bounds for the SSF estimated covariance and the a priori CRLB configured in accordance with an embodiment.

FIG. 13 depicts similar results 1300 with the other four emitters GBR 2, GBR 3, GBR 4, and GBR 5. The 50% bounds for the SSF estimated covariance are depicted by curves 1305, 1310, 1315, and 1320, respectively. The estimated position is at the center of the respective SSF ellipses (which look like lines). The a priori CRLB curves 1325, 1330, 1335, and 1340, for each emitter, respectively, corresponding to the CRLB, indicate that the SSF is statistically consistent.

Figure 14:
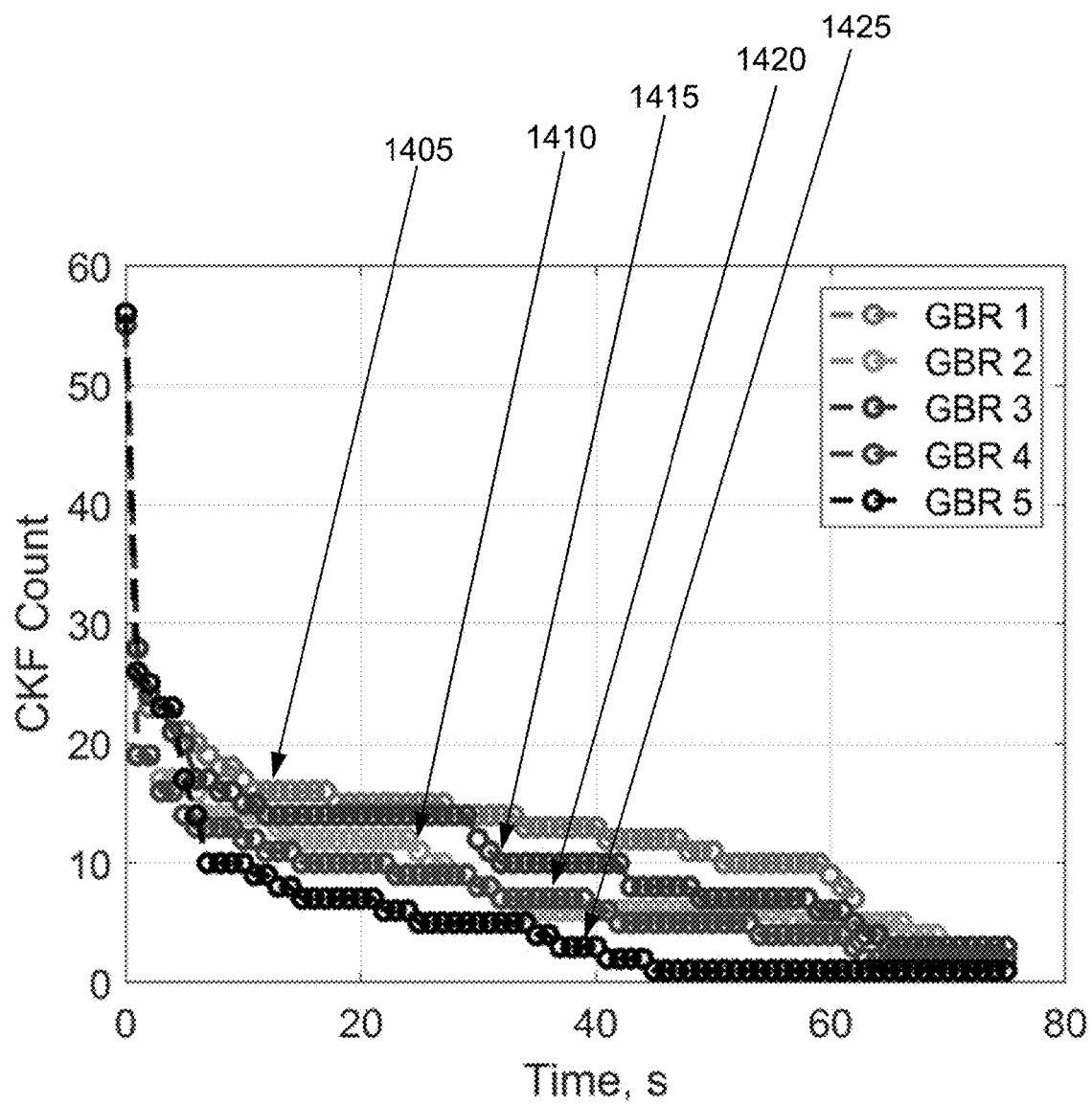
FIG. 14 depicts an example of the number of CKFs decreasing over time for SSF configured in accordance with an embodiment.

FIG. 14 depicts the number of CKFs maintained by the SSF 1400. It shows that the number of CKFs maintained by the SSF 1405, 1410, 1415, 1420, and 1425, for each of GBR 1, GBR 2, GBR 3, GBR 4, and GBR 5, respectively, decreases from 55 to near zero over time from 0 to 80 seconds for all five evaluated GBRs.

Monte Carlo

Performance is now more systematically considered by using Monte Carlo trials. The only variation from trial to trial is the noise added to the direction cosine measurements. 100 Monte Carlo trials are considered for measurements from each emitter. The location estimation error is recorded after each update. In this case, the ideal result is that the SSF has at least one CKF active at the end of the scenario. It is possible that the SSF erroneously discards all CKFs, indicating that the SSF rejects the (correct) hypothesis that all the measurements belong to a single stationary emitter. This is called a misclassification error.

FIGS. 15A-15E depict CRLB performance predictions for location error, actual location error, and classification accuracy for scenarios depicting Monte Carlo trials for each emitter: GBR 1; GBR 2; GBR 3; GBR 4; and GBR 5. For GBR 1 scenario (FIG. 15A), CRLB is 90% CEP; Theory=9.35 km; Achieved=9.49 km; and Moving/Stationary Classification Accuracy=100%. For GBR 2 scenario (FIG. 15B), CRLB is 90% CEP; Theory=10.26 km; Achieved=10.69 km; and Moving/Stationary Classification Accuracy=100%. For GBR 3 scenario (FIG. 15C), CRLB is 90% CEP; Theory=1.28 km; Achieved=1.45 km; and Moving/Stationary Classification Accuracy=99%. For GBR 4 scenario (FIG. 15D), CRLB is 90% CEP; Theory=2.80 km; Achieved=2.66 km; and Moving/Stationary Classification Accuracy=99%. For GBR 5 scenario (FIG. 15E), CRLB is 90% CEP; Theory=0.23 km; Achieved=0.28 km; and Moving/Stationary Classification Accuracy=100%. In each case, the location error drops from over 150 km to under 0.44 km in under 80 seconds.

Moving Surface Filter Description

A less restrictive model embodiment permits the emitter to be moving on the Earth surface. A classic example would be naval or ship-based radars. The model permits the emitter to move along the surface of the Earth at speeds that are reasonably achievable for a surface emitter, e.g., less than 31 ms$^{-1}$. Again, the GSKF is used, but this time a moving surface filter (MSF) is specified. The following discussions address only the differences between the SSF and MSF.

System Model

For embodiments, each CKF has a six dimensional state vector, $\hat{x}$, that corresponds to a position vector stacked on top of a velocity vector, both in Earth-Centered Earth-Fixed (ECEF) coordinates. The nearly constant velocity motion model is used for a moving emitter. This model specifies the state transition matrix:

$$\Phi = \begin{bmatrix} 1 & T \\ 0 & 1 \end{bmatrix} \quad \text{(EQ. 28)}$$

and the plant noise covariance matrix:

$$Q = v_q^2 \begin{bmatrix} T^4/4 & T^3/2 \\ T^3/2 & T^2 \end{bmatrix} \quad \text{(EQ. 29)}$$

where T denotes the elapsed time.

Initialization

The initialization of the position for each CKF in the MSF is identical to the SSF. The velocity components are initialized to zero, and the velocity component of the covariance matrix is initialized to be:

$$P_{vel} = \frac{s_{max}^2}{12} I_3 \quad \text{(EQ. 30)}$$

where $s_{max}$ is the maximum speed of a surface mover to be tracked using this filter.

Scoring

The same scoring logic is used in the MSF as is used in the SSF.

Updating and Pruning of Low Likelihood CKFs

The CKFs are initialized with positions that have a height above the reference WGS84 ellipsoid of zero. (The World Geodetic System (WGS84) is the global ellipsoid model reference coordinate system for GPS established in 1984. It includes a reference ellipsoid, a standard coordinate system, altitude data, and a geoid.) If the object being tracked is a surface mover, then the "height rate" is nearly zero. Embodiments softly enforce this constraint using a pseudo-measurement of "height-rate".

Pruning of "Drifting" CKFs

Since the MSF is tracking moving emitters, the pruning of "drifting" CKF positions calculated for the SSF is not used in the MSF. Rather, in the MSF, CKFs are pruned when the speed estimated by the MSF exceeds (or drifts above) the maximum speed of a surface mover, $s_{max}$, with a sufficient confidence and when the height of the MSF is no longer consistent with being located on the surface of the Earth. When the speed test:

$$\hat{s}_k - 3\sigma_s > s_{max} \quad \text{(EQ. 31)}$$

is true, then the CKF with index k is pruned. The speed test uses the following quantities:

$$\hat{s}_k = \|\dot{p}_k\| \quad \text{(EQ. 32)}$$

$$\sigma_s = \sqrt{H_s \dot{P}_k H_s^T} \quad \text{(EQ. 33)}$$

$$H_s = \frac{1}{\hat{s}_k} \dot{p}_k^T \dot{p}_k \quad \text{(EQ. 34)}$$

$$\hat{x}_k = \begin{bmatrix} p_k \\ \dot{p}_k \end{bmatrix} \quad \text{(EQ. 35)}$$

$$\hat{P}_k = \begin{bmatrix} P_k & 0_3 \\ 0_3 & \dot{P}_k \end{bmatrix} \quad \text{(EQ. 36)}$$

When either:

$$\hat{h}_k - 3\sigma_h > h_{tol} \quad \text{(EQ. 37)}$$

or:

$$\hat{h}_k + 3\sigma_h < h_{tol} \quad \text{(EQ. 38)}$$

are true, then the CKF with index k is pruned. The height test uses an efficient approximation for height, denoted as $\hat{h}_k$, and the following quantities:

$$\sigma_h = \sqrt{H_h P_k H_h^T} \quad \text{(EQ. 39)}$$

and:

$$H_h = \frac{1}{\|p_k\|} p_k^T \quad \text{(EQ. 40)}$$

Pruning of "Redundant" CKFs

The pruning of "redundant" CKFs used in the SSF is also used in the MSF, with the additional constraint that the velocity components are also redundant.

MSF Performance Versus Stationary Surface Emitters

This section considers several example scenarios to demonstrate the performance of the MSF.

Figure 16:
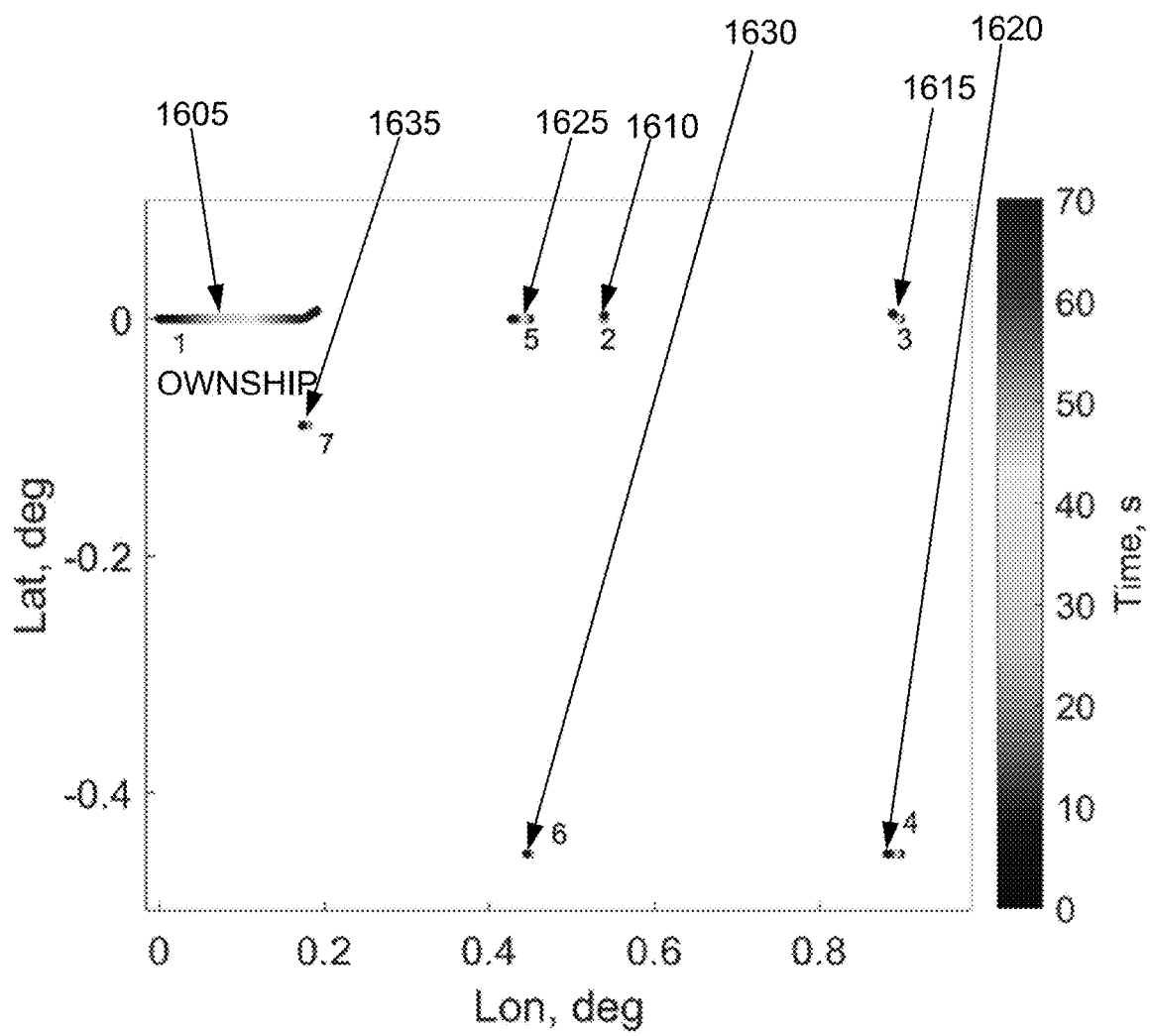
FIG. 16 depicts an example of MSF performance for seven objects configured in accordance with an embodiment.

FIG. 16 depicts the moving surface scenario 1600. The GBRs used to demonstrate the SSF examples are modified to become ground movers. There are seven objects in the scene. Object 1 1605 is the ownship. The other six 1610, 1615, 1620, 1625, 1630, and 1635 are moving surface emitters MSF1-MSF6 that are detected by the ownship 1605. Performance is similar to that achieved with the SSF.

Figure 17A:
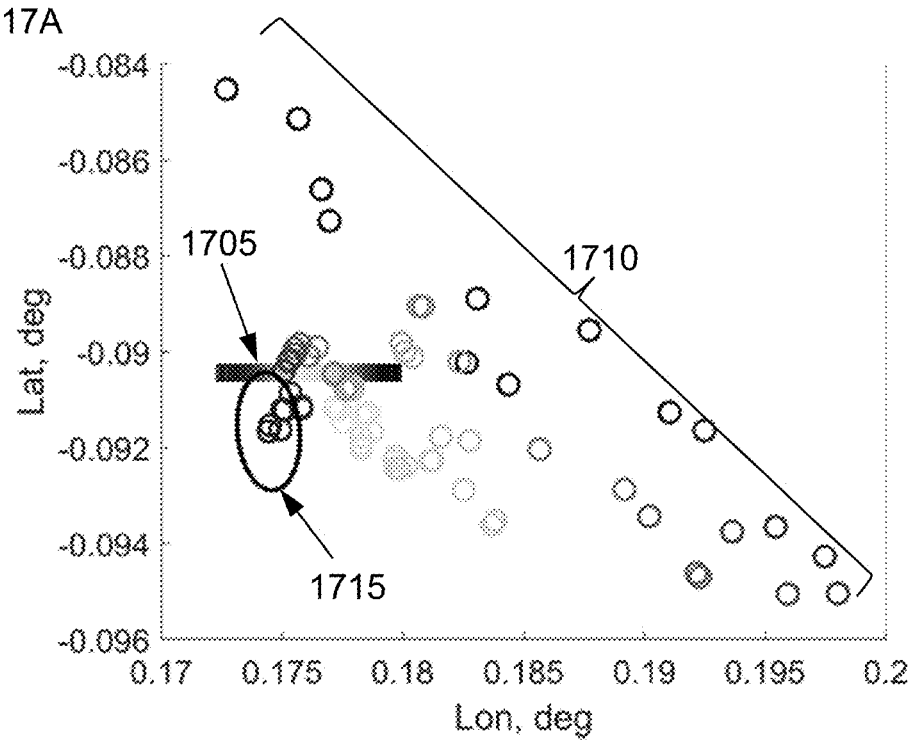
FIGS. 17A and 17B depict an example of MSF performance for two emitters configured in accordance with an embodiment.
Figure 17B:
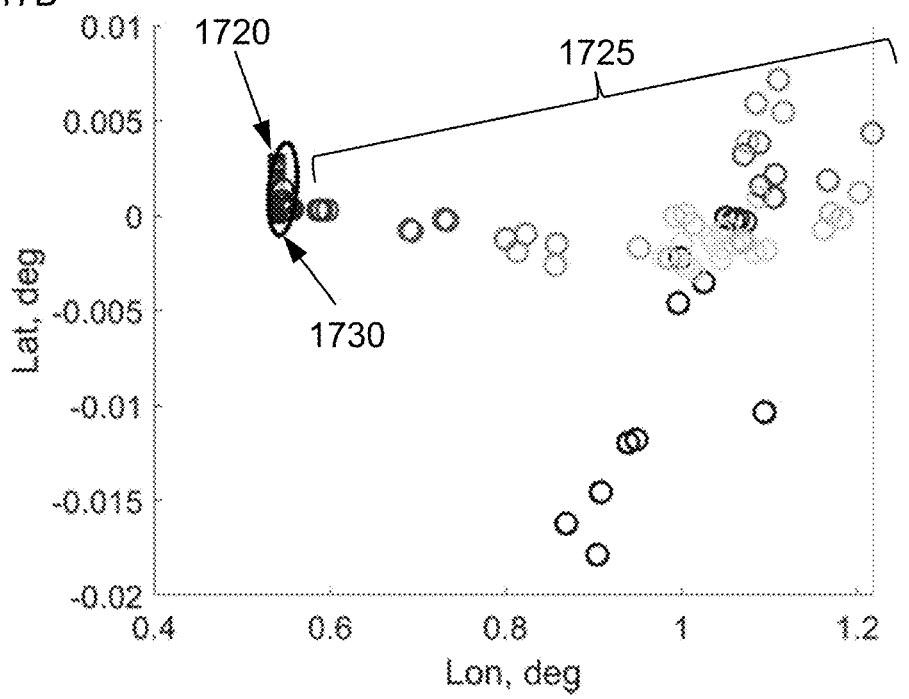

FIGS. 17A and 17B show two performance examples. Moving surface filter performance examples are given for two emitters, 1635 and 1615. One, FIG. 17A, is short range MSF7 1635 and the other, FIG. 17B, is a longer range MSF5 1625. The short range MSF7 truth locations are squares 1705, indicating the passage of time. The estimated locations are circles 1710, also indicating the passage of time. The black ellipse 1715 is the 50% confidence bound for the emitter location at MSF7 at the end of the scenario. The long range MSF5 truth locations are squares 1720, indicating the passage of time. The estimated locations are circles 1725, also indicating the passage of time. The black ellipse 1730 is the 50% confidence bound for the emitter location at MSF5 at the end of the scenario.

Tracking Emitters with Pseudorange Kalman Filter

The discussion and analysis is now expanded to moving emitters. The ability to geolocate a target using only line of-sight (i.e., angle) measurements from a single platform is not viable without additional (a priori) information and/or ownship maneuvers. To account for an ownship maneuver, a stabilization point of reference or a line-of sight estimate must be available. If the signal is known with (very) high confidence to originate from the surface of the Earth, then a stabilization point is available and the approach of the SSF is a path forward. In the more general case, when the signal is not known to be originating from the surface of the Earth, a line-of-sight estimate can be used. There are two methods for obtaining a line-of-sight estimate. The first is to utilize direction cosine measurements from two nearly collocated baseline arrays. The second uses an approximation of zero for the signal elevation with respect to local ENU/NED coordinates (East, North, Up (ENU), North, East, Down (NED)), which is appropriate for signals at long range.

Both methods for estimating a line-of-sight can result in two valid estimates for the line-of-sight, one corresponding to the "front" lobe and the other to the "back" lobe. This ambiguity over time is resolved using the GSKF formulation. Each line-of-sight solution is assumed equally probable at initialization. For each line-of-sight estimate, $\hat{\ell}$, a Kalman filter is defined for tracking the line-of-sight over time. A fixed constant pseudorange measurement, $r_p$, is used and a six state Kalman filter in ECEF coordinates is maintained with updates from angle-of-arrival information. This formulation does not attempt to estimate range information, rather it maintains a state vector that provides a good predictor of the angle-of-arrival information that accounts for ownship maneuvers. The six states are the position and velocity coordinates:

$$x = [p_x\, p_y\, p_z\, \dot{p}_x\, \dot{p}_y\, \dot{p}_z]^T \tag{EQ. 41}$$

The initialization of the position coordinates is given by:

$$\hat{p} = r_p\, \hat{\ell}_{ECEF} + p_0 \tag{EQ. 42}$$

where $p_0$ is the ownship position and $\hat{\ell}_{ECEF}$ is the estimated line-of-sight, both in ECEF coordinates. The initial covariance matrix for the state vector is block diagonal in position and velocity, i.e.:

$$P_0 = \begin{bmatrix} P_p & 0 \\ 0 & P_{\dot{p}} \end{bmatrix} \tag{EQ. 43}$$

The initial position component, $P_p$, is given by adding the line-of-sight covariance (in ECEF) scaled by the pseudorange with the pseudorange variance:

$$P_\gamma = r_p^2 P_\ell + \sigma_{r_\gamma}^2 \hat{\ell}_{ECEF} \hat{\ell}_{ECEF}^T \tag{EQ. 44}$$

In embodiments, information about the angle-of-arrival rates is used when available. For this example assume that this is not the case, and the velocity components are initialized to zero, i.e.:

$$\hat{\dot{p}} = [0\ 0\ 0]^T \tag{EQ. 45}$$

use an a priori bound on the velocity covariance matrix diagonal, i.e.:

$$P_{\dot{p}} = \sigma_v^2 I_3 \tag{EQ. 46}$$

where $\sigma_v$ is on the order of 300 ms$^{-1}$ for a standard airborne platform, and $I_n$ denotes an n dimensional identity matrix.

After each angle-of-arrival measurement update step, a pseudo measurement of range is also processed. Both the pseudo range measurement and the pseudo measurement variance are fixed values. Hence, the term "Pseudorange Kalman Filter" (PKF). The computations and logic used in scoring, updating, and pruning of low likelihood and redundant CKFs are the same as in the SSF. The pruning of "drifting" CKFs is not appropriate for the PKF.

PKF Performance Versus Moving Airborne Emitters

This section, FIGS. 18-20 present examples of scenarios demonstrating the performance of the PKF for moving AirBorne Radar (ABR) emitters. The case for line-of-sight estimation when the emitters are observed with two array baseline vectors is considered first.

FIGS. 18A-18F depict examples of true direction cosines compared with the direction cosines from the first and second CKF for two baseline arrays. In each example (ABR 1-6 corresponding to FIGS. 18A-18F, respectively), the true direction cosines (lines 1805 and 1810) are compared with the direction cosines from the first CKF (circles 1815 and 1820) and the second CKF (dots 1825 and 1830). These PKF direction cosine estimates are overlayed on truth for airborne radars measured using two nearly collocated baseline arrays. Note that the second CKF 1830 is eliminated as correctly inviable at different times. For example, ABR 1 (FIG. 18A) takes about 30 s, ABR 3 (FIG. 18C) takes about 2 s, and ABR 6 (FIG. 18F) eliminates the second CKF after the ownship maneuver begins.

FIGS. 19A-19F depict examples of true direction cosines compared with the direction cosines from the first and second CKF for one baseline array. These are the same performance plots (ABR 1-6 corresponding to FIGS. 19A-19F, respectively) as in FIGS. 18A-18F, except the PKF is initialized and updated using only one baseline array, and the elevation measurement is assumed to be zero degrees. It is clear that when using a single baseline, the PKF is not able to eliminate the second (incorrect) CKF until an ownship maneuver occurs at about 60 seconds 1905. The reliability of this approach may be limited once a maneuver occurs, e.g., the large errors in direction cosine estimates of ABR 4 and ABR 6.

PKF Performance Versus Stationary Surface Emitters

The tracking performance of the PKF versus stationary surface emitters is now considered. In the case when two baseline arrays are available, the performance achieved is similar to or better than that achieved against airborne emitters.

FIGS. 20A-20E depict PKF direction cosine estimates overlayed on truth for the five Ground Based Radars (GBRs) from FIG. 13 measured using only a single baseline array for all direction cosine measurements 2000. Specifically, the correspondence is: GBR 1, FIG. 20A; GBR 2, FIG. 20B; GBR 3, FIG. 20C; GBR 4, FIG. 20D; and GBR 5, FIG. 20E. For the previous ABR cases, the assumption of zero elevation is nearly accurate. The results depicted in FIGS. 20A-20E show that this approximation permits accurate line-of-sight tracking for the stationary surface emitters (GBRs). The accuracy for both direction cosines is good, considering only one direction cosine (2005) is being directly measured. This contrasts with the closest GBR, GBR 5 (FIG. 20E), where the zero degree elevation approximation is poorest.

The computing system used for a generalized angle-based tracker for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A system for a Radio Frequency (RF) generalized angle-based tracker using only angle-based information from a target emitter source, whereby a type of said target is determined comprising:
a memory storing instructions which when interpreted by a processor cause the processor to perform the steps of:
receiving signal data in real-time from a source target emitter signal;
determining angle-based information for said target emitter source from said received signal;
initializing a Stationary Surface Filter (SSF), a Moving Surface Filter (MSF), and a Pseudorange Kalman Filter (PKF) with said angle-based information;
scoring said SSF and MSF by said PKF, whereby if said angle-based information is associated by exceeding a likelihood ratio threshold, then update said SSF, said MSF, and said PKF;
determining if at least one plausible, nonzero likelihood, Constituent Kalman Filter (CKF) exists for each of said SSF and said MSF;
if at least one plausible, nonzero likelihood, CKF exists for said SSF and no CKF exists for said MSF, then classify said target as a surface-level stationary target;
if at least one plausible, nonzero likelihood, CKF exists for said MSF and no CKF exists for said SSF, then classify said target as a surface-level moving target;
if no plausible, nonzero likelihood, CKF exists for both said SSF and said MSF, then classify said target as an airborne moving target;
if said angle-based information is not associated, due to likelihood values of zero, then receive a subsequent signal from said target emitter source and determine angle-based information for said target emitter source from said received signal, and initiate said SSF, MSF, and PKF;
whereby said type of said target is provided to a user.

2. The system of claim 1 wherein the angle-based information used to initialize the SSF comprises calculating a direction cosine, as measured from a front lobe source, from said angle-based information; and parameterize a line-of-sight via:

$$\ell_n = \begin{bmatrix} \sqrt{1 - u_1^2 - v_n^2} \\ u_1 \\ v_n \end{bmatrix}$$

where $\ell n$ is a line of sight, u1 is a single direction cosine measurement, and vn is an nth sampling of a parameterization variable.

3. The system of claim 1 wherein said scoring of said SSF comprises:
extrapolating said CKFs of said SSF when a next measurement uk is received, and selecting a best scoring constituent filter.

4. The system of claim 1, wherein said updating of said SSF comprises:
pruning by removing CKFs of said SSF with likelihood ratios below a specified threshold; and
renormalizing weightings of remaining CKFs, following normalization during initialization.

5. The system of claim 1 wherein said initialization of said MSF comprises:
initializing a velocity component of a covariance matrix P according to:

$$P_{vel} = \frac{s_{max}^2}{12} I_3$$

where smax is a maximum speed of a surface mover to be tracked, and I3 is a three dimensional identity matrix.

6. The system of claim 1, wherein said updating of said MSF comprises:
pruning by removing CKFs with likelihood ratios below a specified threshold.

7. The system of claim 1, wherein said updating of said MSF comprises:
pruning by removing drifting CKFs.

8. The system of claim 1 wherein said initialization angle-based information is an individual direction-cosine measurement, u1.

9. The system of claim 1 wherein determining if at least one plausible CKF exists comprises calculating a CKF likelihood ratio and classifying the CKF as plausible if the likelihood ratio exceeds a threshold of 0.001.

10. A computer readable medium having instructions to perform the steps for a Radio Frequency (RF) generalized angle-based tracker using only angle-based information from a target emitter source, whereby a type of said target is determined comprising:
receiving a source target emitter signal in real time;
determining angle-based information for said target emitter source from said received signal;
initializing a Stationary Surface Filter (SSF), a Moving Surface Filter (MSF), and a Pseudorange Kalman Filter (PKF) with said angle-based information;
scoring said SSF and MSF by said PKF, whereby if said angle-based information is associated by exceeding a likelihood ratio threshold, then update said SSF, said MSF, and said PKF;
determining if at least one plausible, nonzero likelihood, Constituent Kalman Filter (CKF) exists for each of said SSF and said MSF;
if at least one plausible, nonzero likelihood, CKF exists for said SSF and no CKF exists for said MSF, then classify said target as a surface-level stationary target;
if at least one plausible, nonzero likelihood, CKF exists for said MSF and no CKF exists for said SSF, then classify said target as a surface-level moving target;
if no plausible, nonzero likelihood, CKF exists for both said SSF and said MSF, then classify said target as an airborne moving target;
if said angle-based information is not associated, due to likelihood values of zero, then receive a subsequent signal from said target emitter source and determine angle-based information for said target emitter source from said received signal, and initiate said SSF, MSF, and PKF;
whereby said type of said target is provided to a user.

11. The computer readable medium of claim 10, wherein said receiving of a signal from said target emitter source comprises:
constructing two baseline array vectors in y-z axes of an ownship, making angles of +30° and −30° with respect to said ownship body x-axis.

12. The computer readable medium of claim 10, wherein the step of receiving a source target emitter signal from the target emitter source comprises maneuvering an ownship with respect to said target emitter source.

13. The computer readable medium of claim 10, wherein said determining of angle-based information for said target emitter source from said received signal comprises no a-priori information.

14. The computer readable medium of claim 10, wherein the angle-based information used to initialize the SSF comprises calculating a direction cosine, as measured from a rear lobe source, from said angle-based information; and parameterize a line-of-sight via:

$$\ell_n = \begin{bmatrix} -\sqrt{1 - u_1^2 - v_n^2} \\ u \\ v_n \end{bmatrix}$$

where $\ell n$ is a line of sight, u1 is a single direction cosine measurement, and vn is an nth sampling of a parameterization variable.

15. The computer readable medium of claim 10, wherein initializing the MSF comprises setting a maximum speed smax, of a surface mover to be tracked, to less than 31 ms-1.

16. The computer readable medium of claim 10, wherein said scoring of said SSF comprises:
selecting a best-scoring CKF of said SSF and using a Mahalanobis distance associated with that constituent filter for ellipsoidal gating.

17. The computer readable medium of claim 10, wherein determining if at least one plausible Constituent Kalman Filter (CKF) exists comprises calculating a CKF likelihood ratio and classifying the CKF as plausible if the likelihood ratio exceeds a threshold of 0.001.

18. The computer readable medium of claim 10, wherein said target is determined to be from an identified emitter type.

19. A method of signals tracking performing generalized angle-based tracking, using only angle-based information from a target emitter source, comprising:

receiving, in real-time, a source target emitter signal;

determining angle-based information for said target emitter source from said received signal;

initializing a Stationary Surface Filter (SSF), a Moving Surface Filter (MSF), and a Pseudorange Kalman Filter (PKF) with said angle-based information;

scoring said SSF and MSF by said PKF, whereby if said angle-based information is associated by exceeding a likelihood ratio threshold, then update said SSF, said MSF, and said PKF;

determining if at least one plausible, nonzero likelihood, Constituent Kalman Filter (CKF) exists for each of said SSF and said MSF;

if at least one plausible, nonzero likelihood, CKF exists for said SSF and no CKF exists for said MSF, then classify said target as a surface-level stationary target;

if at least one plausible, nonzero likelihood, CKF exists for said MSF and no CKF exists for said SSF, then classify said target as a surface-level moving target;

if no plausible, nonzero likelihood, CKF exists for both said SSF and said MSF, then classify said target as an airborne moving target;

if said angle-based information is not associated, due to likelihood values of zero, then receive a subsequent signal from said target emitter source and determine angle-based information for said target emitter source from said received signal, and initiate said SSF, MSF, and PKF;

whereby a type of said target emitter source is provided to a user.

20. The method of claim 15, wherein said signal is an RF signal.

* * * * *